US009387361B2

(12) United States Patent
Nomura et al.

(10) Patent No.: US 9,387,361 B2
(45) Date of Patent: Jul. 12, 2016

(54) SWING ANALYZING APPARATUS

(75) Inventors: Kazuo Nomura, Shiojiri (JP); Yasushi Nakaoka, Shiojiri (JP)

(73) Assignee: Seiko Epson Corporation (JP)

( * ) Notice: Subject to any disclaimer, the term of this patent is extended or adjusted under 35 U.S.C. 154(b) by 1232 days.

(21) Appl. No.: 13/329,796

(22) Filed: Dec. 19, 2011

(65) Prior Publication Data
US 2012/0157241 A1 Jun. 21, 2012

(30) Foreign Application Priority Data

Dec. 20, 2010 (JP) ................................. 2010-283279
Dec. 20, 2010 (JP) ................................. 2010-283280

(51) Int. Cl.
*A63B 69/38* (2006.01)
*A63B 24/00* (2006.01)
*A63B 69/00* (2006.01)
*G09B 19/00* (2006.01)
*A63B 69/36* (2006.01)

(52) U.S. Cl.
CPC ............. *A63B 24/0003* (2013.01); *A63B 69/00* (2013.01); *A63B 69/0002* (2013.01); *A63B 69/3623* (2013.01); *A63B 69/3632* (2013.01); *A63B 69/38* (2013.01); *G09B 19/0038* (2013.01); *A63B 2208/0204* (2013.01); *A63B 2220/34* (2013.01); *A63B 2220/53* (2013.01); *A63B 2220/833* (2013.01); *A63B 2225/50* (2013.01)

(58) Field of Classification Search
CPC ........... A63B 69/0002; A63B 69/3623; A63B 69/3632; A63B 69/38; A63B 69/0008; A63B 2220/30; A63B 2220/34; A63B 2220/36; A63B 24/0003; A63B 69/00; A63B 2220/53; A63B 2220/833; A63B 2225/50; A63B 2208/0204; G09B 19/0038
USPC .................. 473/459, 461, 219, 221–223, 226
See application file for complete search history.

(56) References Cited

U.S. PATENT DOCUMENTS

| 5,233,544 A * | 8/1993 | Kobayashi ............. A63B 24/00 473/223 |
| 5,688,183 A * | 11/1997 | Sabatino ............ A41D 19/0027 473/209 |
| 6,224,493 B1 | 5/2001 | Lee et al. |
| 9,084,925 B2 * | 7/2015 | Davenport ......... A63B 53/0466 |

(Continued)

FOREIGN PATENT DOCUMENTS

JP 57-103767 U 6/1982
JP 04-141186 A 5/1992

(Continued)

*Primary Examiner* — Raleigh W Chiu
(74) *Attorney, Agent, or Firm* — Harness, Dickey & Pierce, P.L.C.

(57) ABSTRACT

A swing analyzing apparatus includes at least an angular velocity sensor, an impact detection section, an angular velocity information calculation section, and an impact state judgment section. The impact detection section detects the timing of impact in a swing of a sporting good. The angular velocity information calculation section calculates at least one of the amount of change in angular velocity with respect to a predetermined axis in a predetermined period after the impact timing and the greatest value of the angular velocity based on data outputted form the angular velocity sensor. The impact state judgment section judges the state of impact based on the result calculated by the angular velocity information calculation section.

9 Claims, 22 Drawing Sheets

(56) References Cited

U.S. PATENT DOCUMENTS

| | | |
|---|---|---|
| 2001/0005695 A1 | 6/2001 | Lee et al. |
| 2001/0053720 A1 | 12/2001 | Lee et al. |
| 2002/0107085 A1 | 8/2002 | Lee et al. |
| 2004/0106460 A1 | 6/2004 | Lee et al. |
| 2005/0215340 A1 | 9/2005 | Stites et al. |
| 2008/0051208 A1 | 2/2008 | Lee et al. |
| 2010/0093463 A1* | 4/2010 | Davenport ......... A63B 53/0466 473/342 |
| 2010/0216563 A1 | 8/2010 | Stites et al. |
| 2010/0216564 A1 | 8/2010 | Stites et al. |
| 2010/0216565 A1 | 8/2010 | Stites et al. |
| 2011/0313552 A1* | 12/2011 | Davenport ......... A63B 24/0006 700/91 |
| 2012/0115626 A1* | 5/2012 | Davenport ......... A63B 24/0006 473/223 |
| 2015/0273309 A1* | 10/2015 | Kim ................... A63B 69/3608 473/207 |
| 2015/0283428 A1* | 10/2015 | Shibuya ................. G01P 13/00 473/221 |

FOREIGN PATENT DOCUMENTS

| | | |
|---|---|---|
| JP | 2003-024478 A | 1/2003 |
| JP | 3134032 U | 8/2007 |
| JP | 2007-530151 A | 11/2007 |
| JP | 2009-125499 A | 6/2009 |
| JP | 2009-136606 A | 6/2009 |

* cited by examiner

SWING ANALYZING APPARATUS

BACKGROUND

1. Technical Field

The present invention relates to a swing analyzing apparatus.

2. Related Art

In tennis, baseball, golf, and other ball games, playing performance can be improved by hitting a ball at a sweet spot of a sporting good (ball hitting good) to drive the ball at a high speed and by a long distance. A player acquires a swing for hitting a ball at a sweet spot by repeating swing practice. However, since a player or a coach subjectively judges whether or not a ball meets a sweet spot, the practice is not always made efficiently in some cases.

In contrast, there has recently been a proposed method for measuring the state of impact by capturing images of a marked sporting good with a camera and analyzing captured images. The method allows a user to subjectively judge the state of impact. For example, JP-A-2004-24488 proposes a system that captures images of the head of a golf club with a plurality of marks provided on the face of the head with a CCD camera or any other suitable device before and after the time of impact and calculating the position where a ball has met the face based on the images captured at the time of the impact.

The system described above, however, not only requires a camera for capturing images, which results in a large-scale system and an increase in cost, but also needs to place the camera in accordance with a desired angle at which images are captured, which results in difficulty in handling.

SUMMARY

An advantage of some aspects of the invention is to provide a swing analyzing apparatus that is relatively simply configured, readily handled, and capable of subjectively judging the state of impact.

1. An aspect of the invention is directed to a swing analyzing apparatus including an angular velocity sensor, an impact detection section that detects impact timing in a swing of a sporting good, an angular velocity information calculation section that calculates at least one of the amount of change in angular velocity with respect to a predetermined axis in a predetermined period after the impact timing and the greatest value of the angular velocity based on data outputted from the angular velocity sensor, and an impact state judgment section that judges the state of the impact based on the result calculated by the angular velocity information calculation section.

Since the swing analyzing apparatus according to the aspect of the invention can capture rotational motion of the sporting good with respect to the predetermined axis immediately after the impact, the state of the impact can be subjectively judged by selecting the predetermined axis appropriately in accordance with the sporting good. Further, since the swing analyzing apparatus according to the aspect of the invention uses an angular velocity sensor instead of a camera, the configuration of the apparatus can be simplified and the apparatus can be readily handled.

2. In the swing analyzing apparatus, the predetermined axis may be an axis perpendicular not only to an axis around which the sporting good is swung but also to an axis along which the sporting good moves at the impact timing.

For example, when the sporting good is a tennis racket, and a ball meets the tennis racket in a position shifted from the major axis (central axis) thereof, it is believed that rotational motion around the major axis of the tennis racket (axis perpendicular not only to the axis around which the tennis racket is swung but also to the axis along which the tennis racket moves) is produced immediately after the impact. The state of the impact can be judged with precision by capturing the rotational motion.

3. In the swing analyzing apparatus, the predetermined axis may be an axis along which the sporting good moves at the impact timing.

For example, when the sporting good is a baseball bat, and a ball meets the bat in a position shifted from the major axis (central axis) thereof, it is believed that rotational motion around the axis along which the bat moves is produced immediately after the impact. The state of the impact can be judged with precision by capturing the rotational motion.

4. Another aspect of the invention is directed to a swing analyzing apparatus including an angular velocity sensor, an attitude calculation section that calculates an attitude of a sporting good based on data outputted from the angular velocity sensor, an impact detection section that detects impact timing in a swing of the sporting good, an attitude angle change amount calculation section that calculates the amount of change in attitude angle of the sporting good in a predetermined period after the impact timing based on the result calculated by the attitude calculation section, and an impact state judgment section that judges the state of the impact based on the result calculated by the attitude angle change calculation section.

Since the swing analyzing apparatus according to the aspect of the invention can capture rotational motion of the sporting good with respect to the predetermined axis immediately after the impact in the form of the attitude angle of the sporting good, the state of the impact can be subjectively judged by selecting the predetermined axis appropriately in accordance with the sporting good. Further, since the swing analyzing apparatus according to the aspect of the invention uses an angular velocity sensor instead of a camera, the configuration of the apparatus can be simplified and the apparatus can be readily handled.

5. In the swing analyzing apparatus, the impact detection section may detect, as the impact timing, the timing at which the magnitude of the angular velocity with respect to the axis around which the sporting good is swung is maximized by detecting the greatest magnitude of the angular velocity with respect to the axis around which the sporting good is swung based on data outputted from the angular velocity sensor.

It is generally believed that the angular velocity with respect to the axis around which a sporting good is swung is maximized immediately before the impact, whereby the thus configured swing analyzing apparatus can detect the impact timing.

6. In the swing analyzing apparatus, the impact state judgment section may variably set a judgment reference based on which the state of the impact is judged in accordance with the greatest magnitude of the angular velocity with respect to the axis around which the sporting good is swung.

It is generally believed that even when a ball meets the sporting good in the same position, different swing speeds of a sporting good produce rotational motion of different magnitudes. The swing analyzing apparatus can accurately judge the state of impact by appropriately setting a judgment reference according to the swing speed.

7. In the swing analyzing apparatus, the impact state judgment section may judge the state of the impact by using a plurality of levels.

Setting a plurality of judgment levels allows a user to obtain information not only on whether or not the user has successfully hit a ball but also, when the user has failed to successfully hit the ball, on how much the user has failed.

8. In the swing analyzing apparatus, the angular velocity sensor may be so attached to the sporting good that a detection axis of the angular velocity sensor coincides with the predetermined axis.

Since the predetermined axis is known in the above configuration, it is not necessary to calculate the predetermined axis.

9. In the swing analyzing apparatus, the angular velocity sensor may be so attached to the sporting good that a detection axis of the angular velocity sensor coincides with the axis around which the sporting good is swung.

Since the axis around which the sporting good is swung is known in the above configuration, it is not necessary to calculate the predetermined axis.

10. The swing analyzing apparatus may further includes an attitude calculation section that calculates an attitude of the sporting good based on data outputted from the angular velocity sensor and a rotational axis calculation section that calculates at least one of the predetermined axis and the axis around which the sporting good is swung based on information on the attitude of the sporting good.

For example, in the case of a baseball bat or any other sporting good that does not allow a user to identify the ball hitting plane thereof because the ball hitting plane changes in accordance with how the user grasps the bat, the angle at which the user grasps the sporting good and other factors change the positional relationship between the predetermined axis (that is, the axis of rotation around which the sporting good rotates when a ball has failed to successfully meet the sporting good) and the detection axis of the angular velocity sensor for each swing. Further, for example, the inclination of the sporting good at the time of swing and other factors change the positional relationship between the axis around which the sporting good is swung and the detection axis of the angular velocity sensor for each swing. The swing analyzing apparatus described above can identify the predetermined axis and the axis around which the sporting good is swung by calculating the attitude of the sporting good without having to limiting the angle at which the user grasps the sporting good or the inclination of the sporting good at the time of swing.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

A preferred embodiment of the invention will be described below in detail with reference to the drawings. The embodiment described below is not intended to inappropriately limit the contents of the invention set forth in the claims. Further, all the configurations described below are not necessarily essential in the invention.

1-1. Configuration of Swing Analyzing Apparatus

Figure 1:
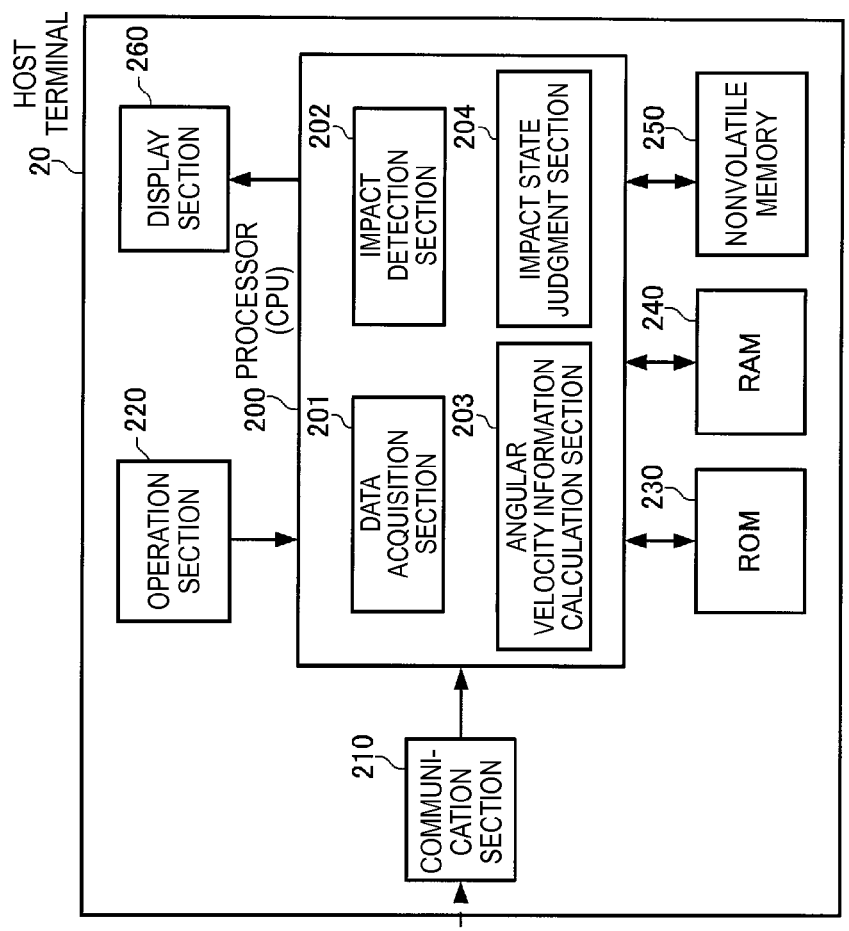
FIG. 1 shows the configuration of a swing analyzing apparatus according to a first embodiment.
Figure 1:
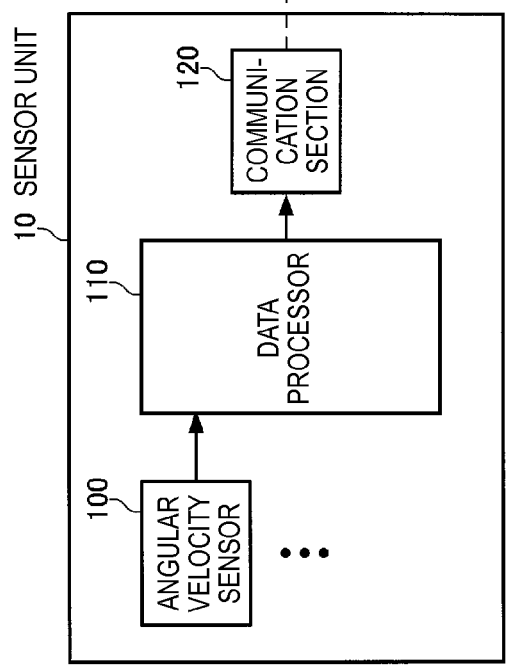

FIG. 1 shows the configuration of a swing analyzing apparatus according to the present embodiment. A swing analyzing apparatus 1 according to the present embodiment includes one or more sensor units 10 and a host terminal 20. The sensor unit 10 and the host terminal 20 may be wirelessly connected or wired to each other.

The sensor unit 10 is attached to a sporting good that undergoes swing analysis. In the present embodiment, the sensor unit 10 includes one or more angular velocity sensors 100, a data processor 110, and a communication section 120.

Each of the angular velocity sensors 100 detects the angular velocity around a detection axis thereof and outputs a signal according to the magnitude of the detected angular velocity (angular velocity data).

The data processor 110 synchronizes the data outputted from the angular velocity sensors 100 with each other and outputs packets obtained by combining the data with time stamps and other information to the communication section 120. The data processor 110 may be configured to further perform bias correction and temperature correction on the angular velocity sensors 100. The functions of bias correction and temperature correction may alternatively be incorporated in each of the angular velocity sensors 100.

The communication section 120 sends the packet data received from the data processor 110 to the host terminal 20.

The host terminal 20 includes a processor (CPU) 200, a communication section 210, an operation section 220, a ROM 230, a RAM 240, a nonvolatile memory 250, and a display section 260. The host terminal 20 can be formed of a personal computer (PC) or a smart phone or any other similar mobile apparatus.

The communication section 210 receives data sent from the sensor unit 10 and sends the data to the processor 200.

The operation section 220 acquires data according to user's operation and sends the data to the processor 200. The operation section 220 is formed, for example, of a touch-panel display, buttons, keys, or a microphone.

The ROM 230 stores, for example, a program that instructs the processor 200 to perform a variety of computation and control operation and a variety of programs and data for performing application functions.

The RAM 240 is a storage section that is used as a work area used by the processor 200 and temporarily stores programs and data read from the ROM 230, data inputted through the operation section 220, results computed by the processor 200 in accordance with a variety of programs, and other information.

The nonvolatile memory 250 is a recording section that records part of data produced in processes performed by the processor 200, specifically, data required to be saved for a long period.

The display section 260 displays the results processed by the processor 200 in the form of character, graph, and other images. The display section 260 is, for example, a CRT, an LCD, a touch-panel display, or an HMD (head mount display). A single touch-panel display may alternatively serve as both the operation section 220 and the display section 260.

The processor 200 performs a variety of computation and control operation on data received from the sensor unit 10 via the communication section 210 (such as display and control operation on display section 260) in accordance with the programs stored in the ROM 240.

In the present embodiment, the processor 200 functions as a data acquisition section 201, an impact detection section 202, an angular velocity information calculation section 203, and an impact state judgment section 204, which will be described below. The processor 200 in the present embodiment may be configured not to have part of the functions described above.

The data acquisition section 201 acquires data outputted from the sensor unit 10 (angular velocity data) and received via the communication section 210. The acquired data are stored, for example, in the RAM 240.

The impact detection section 202 detects the timing of impact in a swing of a sporting good (hereinafter simply referred to as "impact").

The angular velocity information calculation section 203 calculates at least one of the following values based on the data outputted from the sensor unit 10 (angular velocity data): the amount of change in angular velocity with respect to a predetermined axis (hereinafter referred to as "judgment axis") in a predetermined period after the impact timing and the greatest value of the angular velocity.

The impact state judgment section 204 judges the state of impact based on the result calculated by the angular velocity information calculation section 203.

All or part of the data acquisition section 201, the impact detection section 202, the angular velocity information calculation section 203, and the impact state judgment section 204 may be incorporated in the sensor unit 10.

Figure 2:
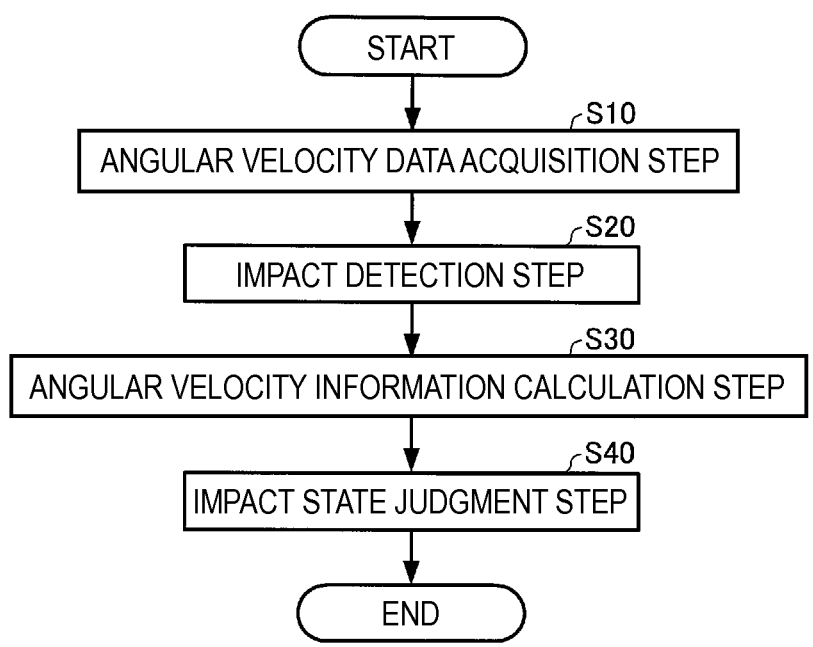
FIG. 2 is a flowchart showing exemplary processes performed by a processor.

FIG. 2 is a flowchart showing exemplary processes performed by the processor 200. The processor 200 first operates as the data acquisition section 201 to acquire angular velocity data from the sensor unit 10 (S10, angular velocity data acquisition step).

The processor 200 then operates as the impact detection section 202 to detect the impact timing (S20, impact detection step). For example, the processor 200 (impact detection section 202) may detect the timing at which the magnitude of the angular velocity with respect to the axis around which a sporting good is swung (hereinafter referred to as "swing axis") is maximized by detecting the greatest magnitude of the angular velocity with respect to the swing axis based on the data outputted from the sensor unit 10 (angular velocity data), and the processor 200 may set the detected timing as the impact timing.

The processor 200 then operates as the angular velocity information calculation section 203 to calculate at least one of the amount of change in angular velocity with respect to the judgment axis in a predetermined period after the impact timing and the greatest value of the angular velocity based on the angular velocity data acquired in S10 (S30, angular velocity information calculation step). As the judgment axis, the axis of rotation around which the sporting good rotates immediately after the impact may be selected appropriately in accordance with the shape of the sporting good, the direction of the swing, and other factors. For example, an axis along which the sporting good moves at the impact timing or an axis perpendicular to not only the swing axis but also the axis extending in the direction in which the sporting good moves at the impact timing may be the judgment axis. The sensor unit 10 may be so attached to the sporting good that the detection axis of any of the angular velocity sensors 100 coincides with the judgment axis. The sensor unit 10 may alternatively be so attached to the sporting good that the detection axis of any of the angular velocity sensors 100 coincides with the swing axis.

The processor 200 finally operate as the impact state judgment section 204 to judge the state of impact based on the calculation result in S30 (S40, impact state judgment step). For example, the processor 200 (impact state judgment section 204) may variably set, in accordance with the greatest magnitude of the angular velocity with respect to the swing axis, a judgment reference based on which the state of impact is judged. Further, for example, the processor 200 (impact state judgment section 204) may judge the state of impact by using a plurality of levels. The processor 200 may then, for example, display the result of judgment of the state of impact on the display section 260 or output the result in the form of audio.

1-2. Specific Examples

Figure 3A:
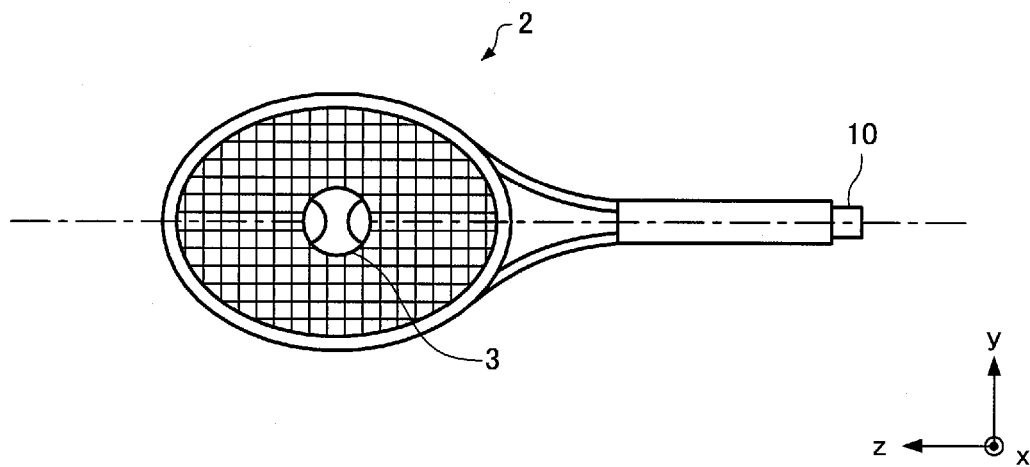
FIGS. 3A and 3B describe an example of judging the state of impact in a swing of a tennis racket.
Figure 3B:
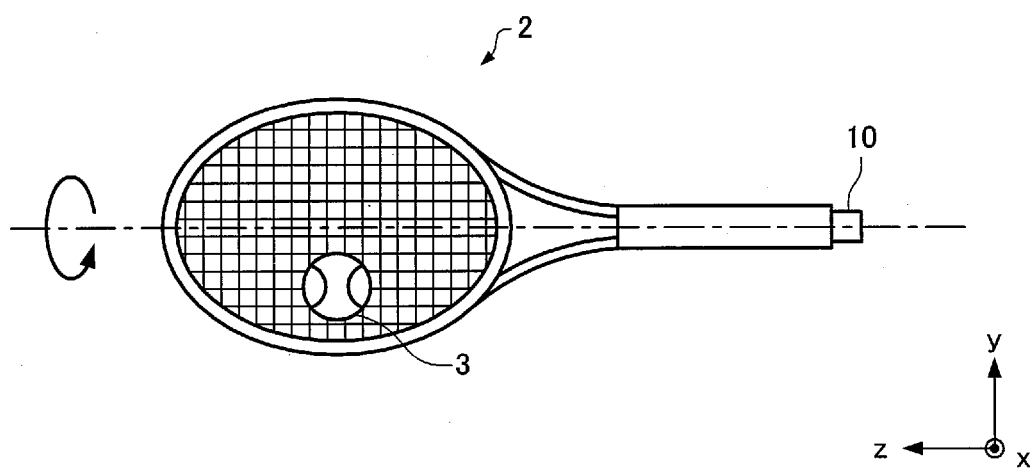

A method according to the present embodiment will next be described with reference to a case where the state of impact in a swing of a tennis racket is judged. FIG. 3A shows that a tester swings a tennis racket 2 and hits a tennis ball 3 with the tennis racket 2 in a position on the major axis thereof (z axis indicated by long dashed short dashed line). On the other hand, FIG. 3B shows that the tester swings the tennis racket 2 and hits the tennis ball 3 with the tennis racket 2 in a position shifted downward from the major axis thereof (z axis indicated by long dashed short dashed line). When the tennis ball 3 meets the tennis racket 2 in a position on the major axis thereof (when the tennis ball 3 perfectly meets the tennis racket 2), substantially no rotation around the major axis is produced, whereas when the tennis ball 3 meets the tennis racket 2 in a position shifted from the major axis (when the tennis ball 3 fails to successfully meet the tennis racket 2), rotation around the major axis (arrow in FIG. 3B) is produced immediately after the impact. Whether or not the tennis ball 3 meets the tennis racket 2 in a position on the major axis thereof can therefore be judged based on the amount of change in angular velocity around the major axis immediately after the impact. That is, the major axis of the tennis racket 2 can be considered as the judgment axis.

Further, the impact timing can be judged based on the angular velocity around the swing axis. When the tennis racket 2 is swung, an axis perpendicular to the major axis of the tennis racket 2 and oriented upward (y axis in FIGS. 3A and 3B) may be considered as the swing axis. When the tennis racket is swung, the absolute value of the angular velocity around the swing axis gradually increases during a period from the start of the swing to the instant of impact, and at the instant of impact, when the tennis ball 3 meets the tennis racket 2, the absolute value of the angular velocity around the swing axis decreases. That is, the impact timing can be detected based on the fact that the absolute value of the angular velocity around the swing axis is maximized immediately before the impact.

To capture the angular velocity around the swing axis and the angular velocity around the judgment axis, for example, the sensor unit 10 including three angular velocity sensors capable of detecting angular velocities along three axes perpendicular to one another (x, y, and z axes) is so attached to the grip end of the tennis racket 2 that, for example, the x axis is perpendicular to the ball hitting plane and the z axis coincides with the major axis of the tennis racket 2. In this configuration, the impact timing can be detected based on the greatest value of the angular velocity around the y axis (swing axis), and the state of impact can be judged based on the amount of change in angular velocity around the z axis (judgment axis) immediately after the impact. The sensor unit 10 is not necessarily attached to the grip end of the tennis racket 2 but can be attached to an arbitrary portion where the attached sensor unit 10 does not interfere with a swing.

Figure 4:
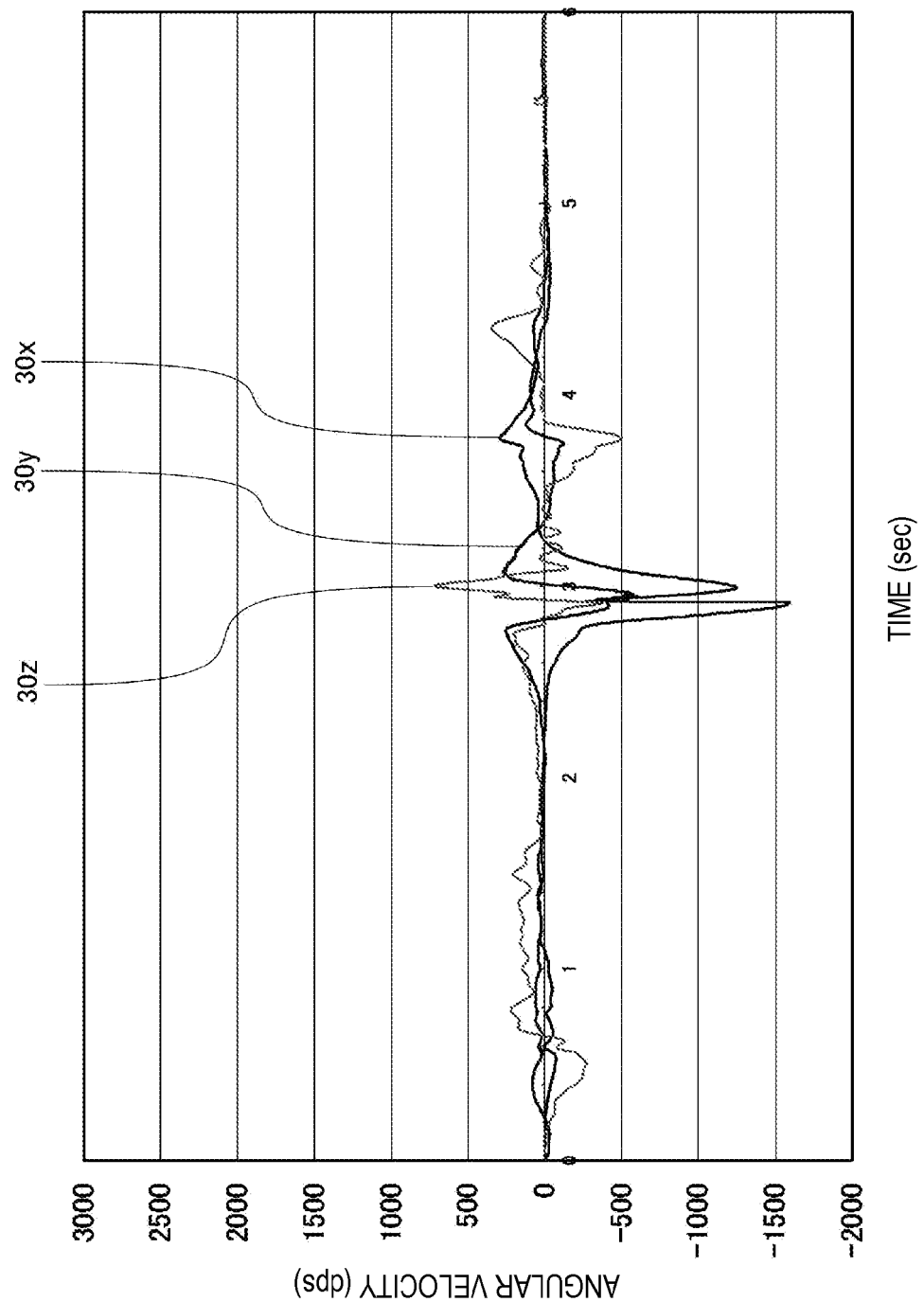
FIG. 4 shows an example of angular velocity data measured when a tennis ball perfectly meets a tennis racket.
Figure 5:
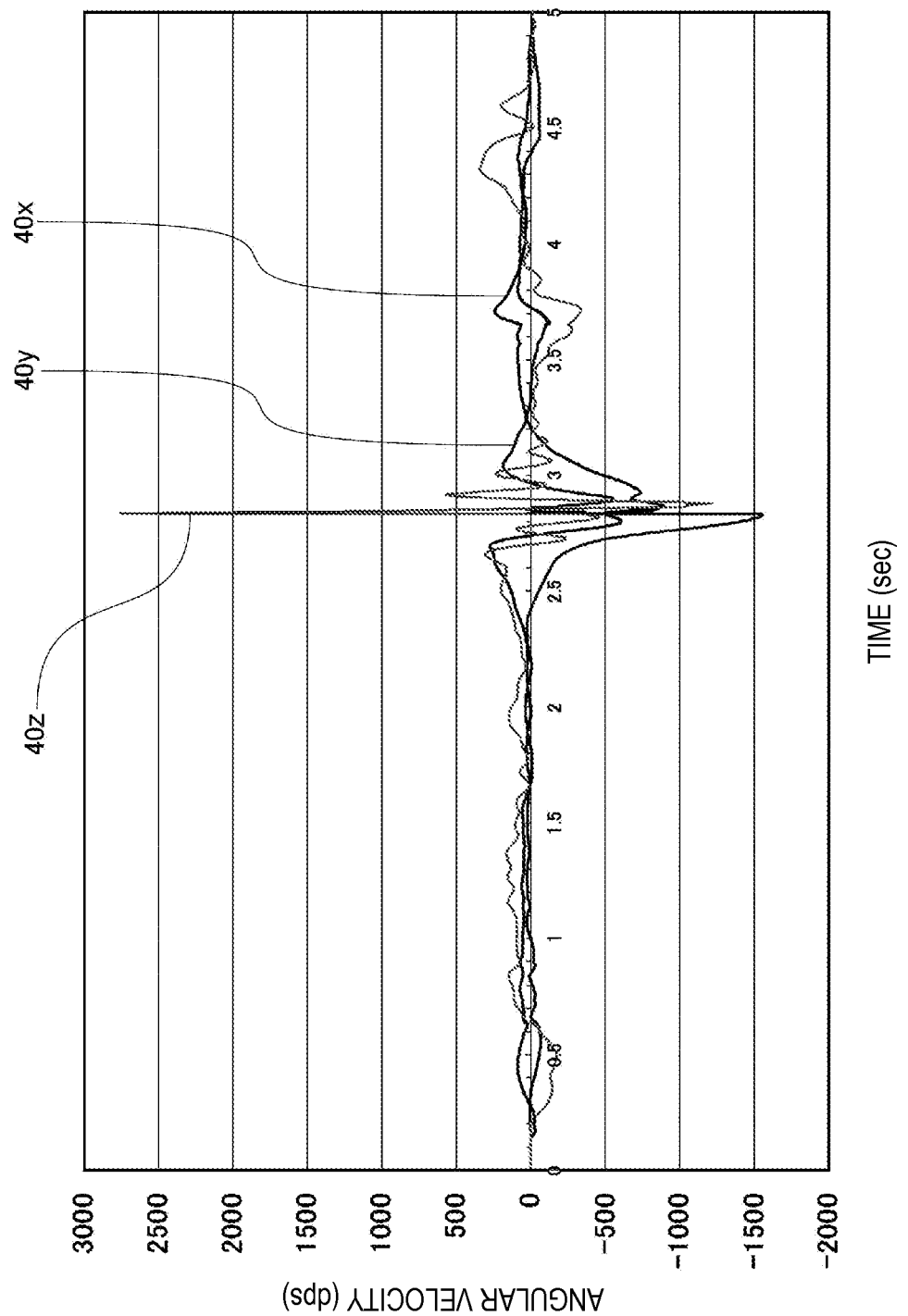
FIG. 5 shows an example of angular velocity data measured when the tennis ball fails to successfully meet the tennis racket.

FIG. 4 shows an example of angular velocity data measured when the tennis ball has perfectly met the tennis racket. Reference characters 30x, 30y, and 30z denote angular velocity data around the x, y, and z axes, respectively. On the other hand, FIG. 5 shows an example of angular velocity data measured when the tennis ball has failed to successfully meet the tennis racket. Reference characters 40x, 40y, and 40z denote angular velocity data around the x, y, and z axes, respectively. Comparison between FIGS. 4 and 5 shows that the amount of change in angular velocity around the z axis immediately after the impact greatly differs from one to the other and that the amount of change measured when the tennis ball fails to successfully meet the tennis racket is greater than the other. The amount of change in angular velocity measured when the tennis ball fails to successfully meet the tennis racket 2 changes in accordance with the weight of the tennis racket 2. For example, when the tennis racket 2 is light, the amount of change in angular velocity measured when the tennis ball 3 fails to successfully meet the tennis racket 2 increases, whereas when the tennis racket 2 is heavy, the amount of change in angular velocity measured when the tennis ball 3 fails to successfully meet the tennis racket 2 decreases.

Figure 6:
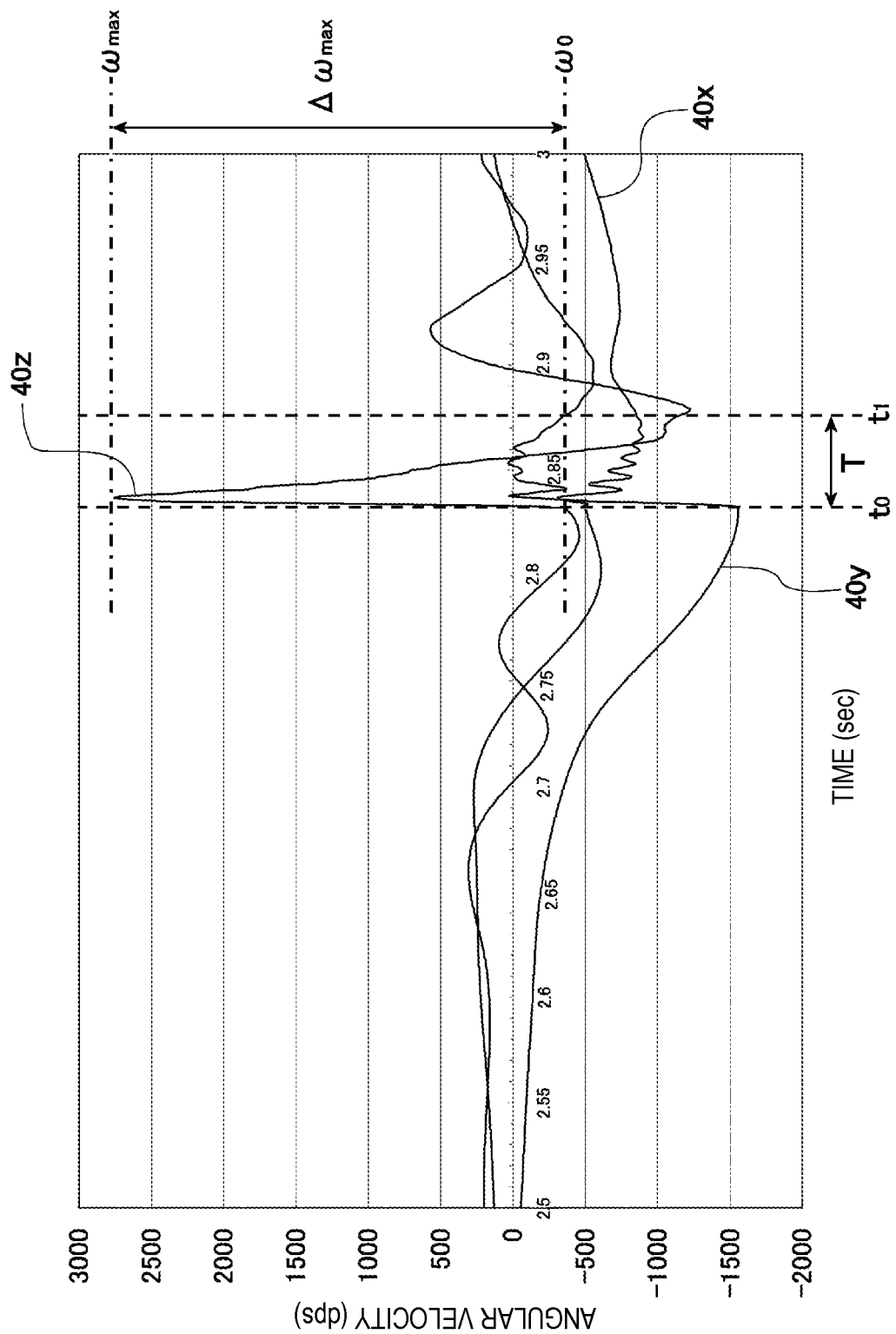
FIG. 6 is an enlarged view of the angular velocity data in a period before and after the impact.

FIG. 6 is an enlarged view of the angular velocity data in FIG. 5 in a period before and after the impact. In FIG. 6, time $t_0$, when the absolute value of the angular velocity around the y axis is maximized, is the impact timing, and the angular velocity around the z axis greatly changes immediately after the impact. In the present embodiment, the amount of change in angular velocity around the z axis in the period from the time $t_0$, at which the impact occurs, to time $t_1$ after a predetermined period T (0.05 seconds, for example) is calculated. Specifically, the greatest amount of change in angular velocity $\Delta\omega_{max}$ in the predetermined period T is calculated with reference to an angular velocity $\omega_0$ around the z axis at the time of impact $t_0$. The state of impact is then judged based on the magnitude of the thus calculated $\Delta\omega_{max}$.

Figure 7:
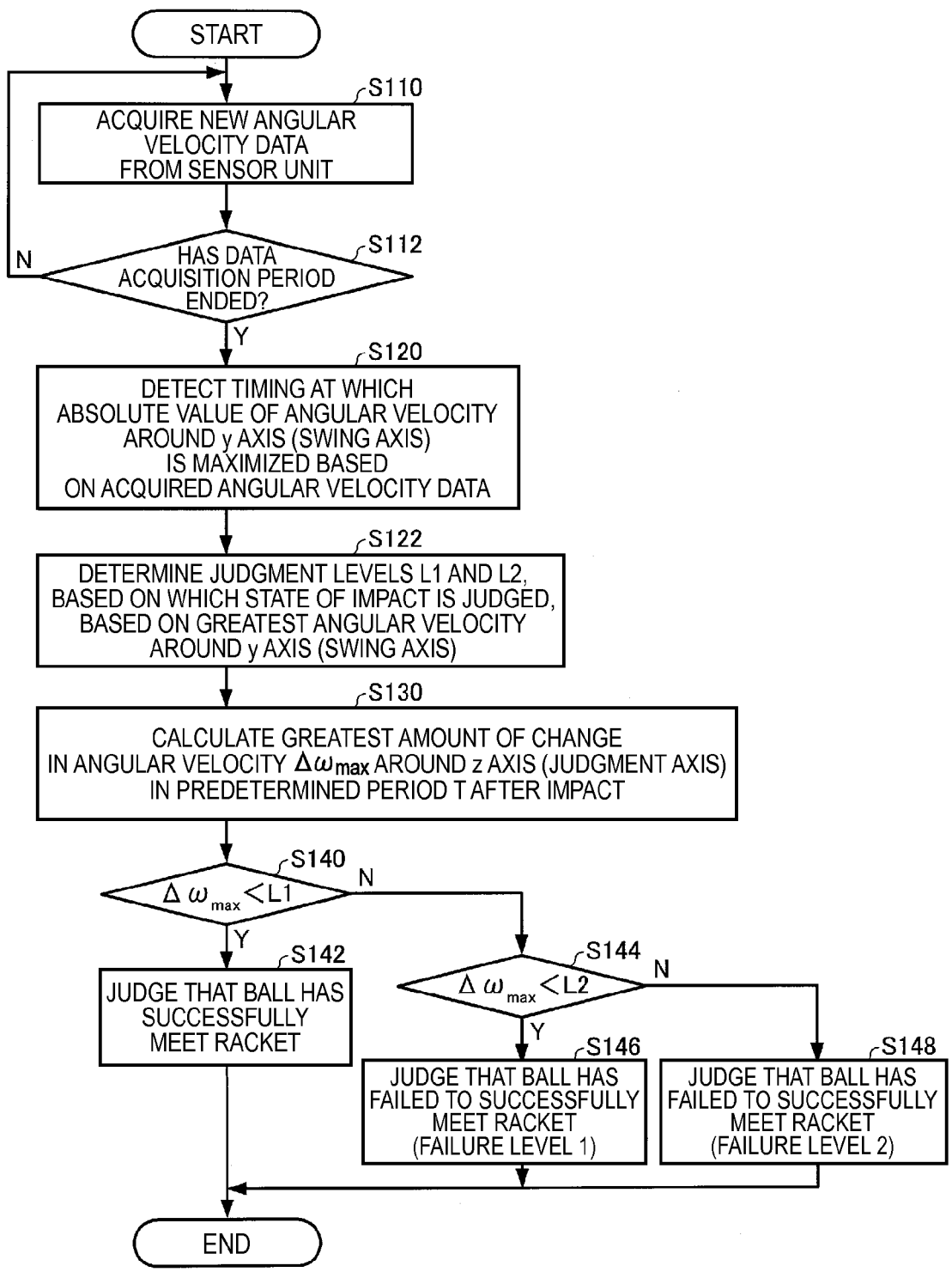
FIG. 7 shows a specific example of a flowchart according to which the state of impact is judged in the present embodiment.

FIG. 7 shows a specific example of a flowchart according to which the processor 200 judges the state of impact. In the example shown in FIG. 7, the state of impact is judged by using three levels. The processor 200 first periodically acquires new angular velocity data from the sensor unit 10 until a data acquisition period ends (N in S112) (S110). The data acquisition period is a predetermined period including at least periods before and after the impact, for example, may be a period from the start of a swing to the end of the swing or may include a stationary period before a swing starts and a stationary period after the swing ends.

The processor 200 then detects the timing at which the absolute value of the angular velocity around the y axis (swing axis) is maximized (impact timing) based on the angular velocity data acquired in S110 (S120).

The processor 200 then determines judgment levels (judgment references) L1 and L2, based on which the state of impact is judged, based on the greatest angular velocity (greatest absolute value of angular velocity) around the y axis (swing axis) (S122). That is, since the magnitude of the greatest angular velocity (swing speed) around the y axis (swing axis) is believed to correlate with the amount of change in angular velocity around the z axis (judgment axis) immediately after the impact, the judgment levels L1 and L2, based on which the state of impact is judged, are variably set in accordance with the swing speed.

The processor 200 then calculates the greatest amount of change in angular velocity $\Delta\omega_{max}$ around the z axis (judgment axis) in the predetermined period T after the impact timing detected in S120 (S130).

The processor 200 then compares $\Delta\omega_{max}$ with the judgment levels L1 and L2 determined in step S122. When $\Delta\omega_{max} < L1$ (Y in S140), the processor 200 judges that the tennis ball has successfully met (perfectly met, for example) the tennis racket (S142). When $L1 \leq \Delta\omega_{max} < L2$ (N in S140 and Y in S144), the processor 200 judges that the tennis ball has failed to successfully meet (slightly failed to perfectly meet, for example) the tennis racket (failure level 1) (S146). When $\Delta\omega_{max} \geq L2$ (N in S140 and N in S144), the processor 200 judges that the tennis ball has failed to successfully meet (substantially failed to perfectly meet, for example) the tennis racket (failure level 2) (S148). As described above, setting a plurality of judgment levels allows a user to obtain information not only on whether or not the user has successfully hit the tennis ball but also, when the user has failed to successfully hit the tennis ball, on how much the user has failed.

S110 and S112 in the flowchart in FIG. 7 correspond to S10 in the flowchart in FIG. 2 (angular velocity data acquisition step). S120 in the flowchart in FIG. 7 corresponds to S20 in the flowchart in FIG. 2 (impact detection step). S130 in the flowchart in FIG. 7 corresponds to S30 in the flowchart in FIG. 2 (angular velocity information calculation step). S140, S142, S144, S146, and S148 in the flowchart in FIG. 7 correspond to S40 in the flowchart in FIG. 2 (impact state judgment step).

The present embodiment has been described with reference to the case where the swing axis and the judgment axis coincide with the detection axes of particular ones of the angular velocity sensors 100, but they may not coincide with each other in some cases depending on the position in which or the angle at which the sensor unit 10 is attached. In such a case, correction parameters having been created in advance may be used to correct the discrepancy between the swing and judgment axes and the detection axes.

The method according to the present embodiment, which has been described with reference to the case where the sporting good is a tennis racket, is also applicable to other sporting goods as long as the swing and judgment axes are appropriately defined in accordance with a sporting good in question.

Figure 8A:
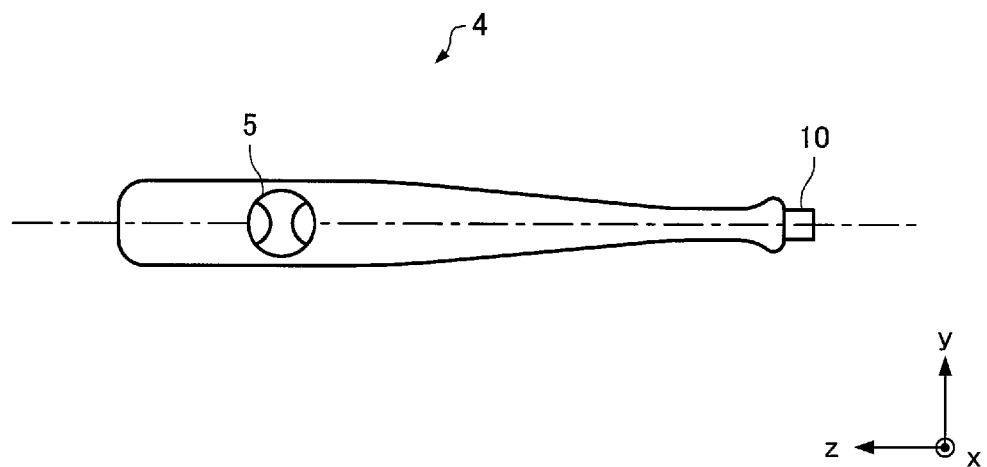
FIGS. 8A and 8B describe an example of judging the state of impact in a swing of a bat.
Figure 8B:
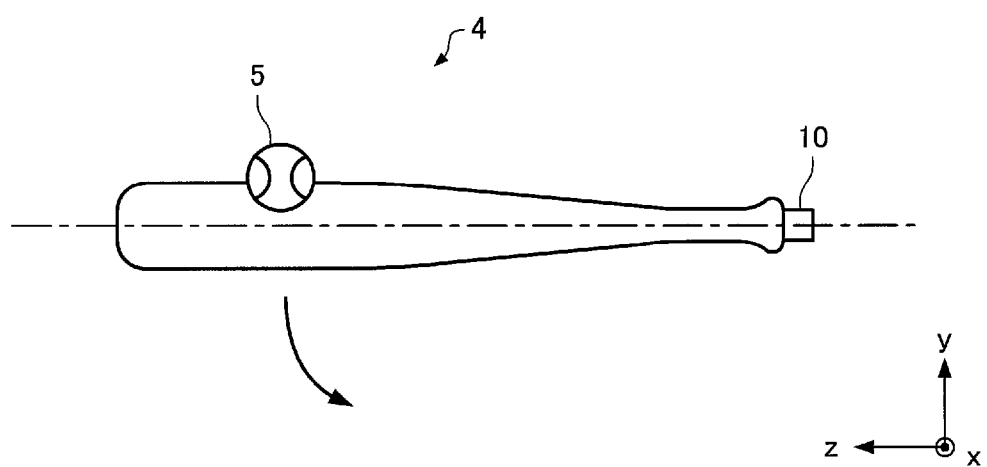

For example, FIG. 8A shows that a tester swings a baseball bat 4 and hits a ball 5 with the bat 4 in a position on the major axis thereof (z axis indicated by long dashed short dashed line). On the other hand, FIG. 8B shows that the tester swings the bat 4 and hit the ball 5 with the bat 4 in a position shifted upward from the major axis thereof (z axis indicated by long dashed short dashed line). When the ball 5 meets the bat 4 in a position on the major axis thereof (when the ball 5 perfectly meets the bat 4), substantially no rotation around an axis perpendicular to both the major axis and the swing axis (x axis along which the bat 4 moves) is produced, whereas when the ball 5 meets the bat 4 in a position shifted from the major axis thereof (when the ball 5 fails to successfully meet the bat 4), rotation around the axis along which the bat 4 moves (arrow in FIG. 8B) is produced immediately after the impact. Whether or not the ball 5 has met the bat 4 in a position on the major axis thereof can therefore be judged based on the amount of change in angular velocity around the axis along which the bat 4 moves immediately after the impact. That is, the axis along which the bat 4 moves can be considered as the judgment axis. Further, the impact timing can be judged based on the angular velocity around the swing axis, as in the case of the tennis racket.

To capture the angular velocity around the swing axis and the angular velocity around the judgment axis, for example, the sensor unit 10 including three angular velocity sensors capable of detecting angular velocities along three axes perpendicular to one another (x, y, and z axes) is so attached to the grip end of the bat 4 that, for example, the z axis coincides with the major axis of the bat 4. When the tester grasps and swings the bat 4 in such a way that the x axis and the y axis coincide with the judgment axis and the swing axis respectively at the instant of impact, the impact timing can be detected based on angular velocity data around the y axis (swing axis), and the state of impact can be judged based on angular velocity data around the x axis (judgment axis) immediately after the impact. The sensor unit 10 is not necessarily attached to the grip end of the bat 4 but can be attached to an arbitrary portion where the attached sensor unit 10 does not interfere with a swing.

Figure 9A:
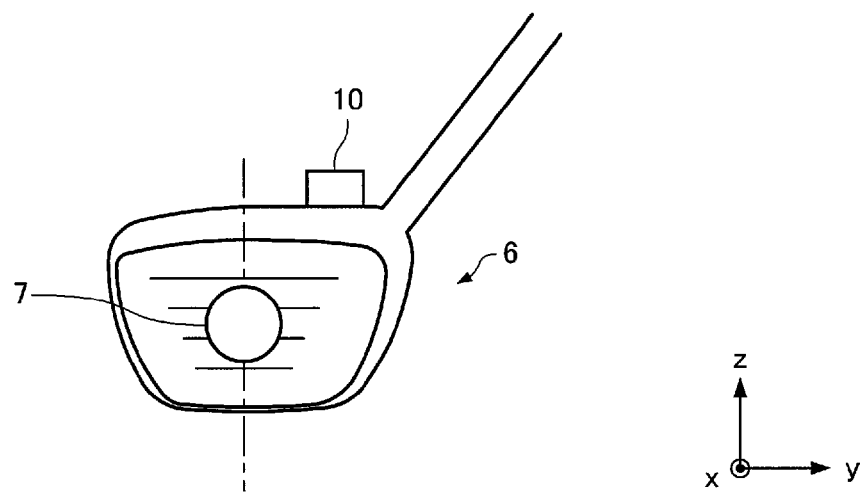
FIGS. 9A and 9B describe an example of judging the state of impact in a swing of a golf club.
Figure 9B:
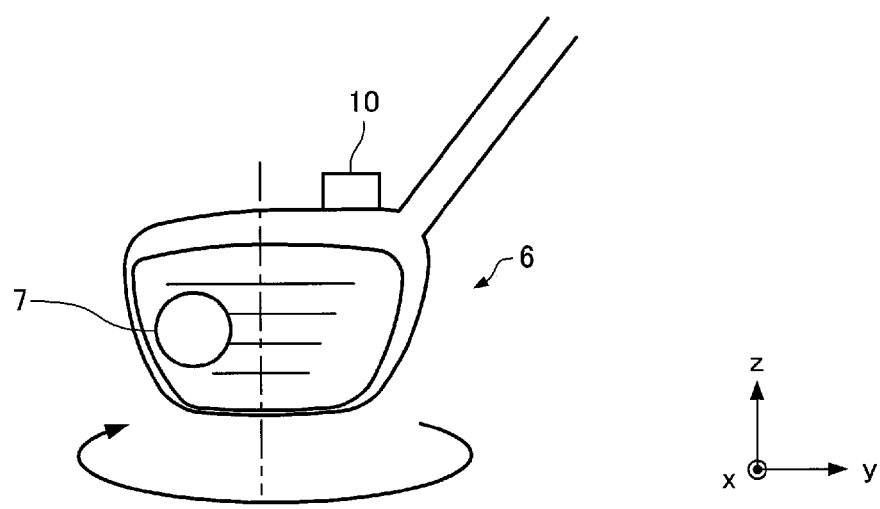

Further, for example, FIG. 9A shows that a tester swings a golf club 6 and hits a golf ball 7 with the golf club 6 in a position on the central axis of the head thereof (z axis indicated by long dashed short dashed line). On the other hand, FIG. 9B shows that the tester swings the golf club 6 and hits the golf ball 7 with the golf club 6 in a position shifted leftward from the central axis of the head thereof (z axis indicated by long dashed short dashed line). When the golf ball 7 meets the golf club 6 in a position on the central axis of the head thereof (when the golf ball 7 perfectly meets the head of the golf club 6), substantially no rotation around the central axis is produced, whereas when the golf ball 7 meets the golf club 6 in a position shifted from the central axis of the head thereof (when the golf ball 7 fails to successfully meet the head of the golf club 6), rotation around the central axis (arrow in FIG. 9B) is produced immediately after the impact. Whether or not the golf ball 7 has met the golf club 6 in a position on the central axis thereof can therefore be judged based on the amount of change in angular velocity around the central axis of the head of the golf club 6 immediately after the impact. That is, the central axis of the head of the golf club 6 can be considered as the judgment axis. Further, the impact timing can be judged based on the angular velocity around the swing axis, as in the case of the tennis racket.

To capture the angular velocity around the swing axis and the angular velocity around the judgment axis, for example, the sensor unit 10 including three angular velocity sensors capable of detecting angular velocities along three axes perpendicular to one another (x, y, and z axes) is so attached to the head of the golf club 6 that, for example, the x axis is perpendicular to the ball hitting plane and the z axis coincides with the central axis of the head of the golf club 6. In this configuration, the impact timing can be detected based on angular velocity data around the y axis (swing axis), and the state of impact can be judged based on angular velocity data around the z axis (judgment axis) immediately after the impact. The sensor unit 10 is not necessarily attached to the head of the golf club 6 but can be attached to an arbitrary portion where the attached sensor unit 10 does not interfere with a swing.

As described above, according to the swing analyzing apparatus of the present embodiment, rotational motion of a sporting good produced at the time of impact can be captured by calculating the greatest amount of change in angular velocity with respect to the judgment axis in a predetermined period immediately after the impact. The state of the impact can therefore be subjectively judged by selecting the judgment axis appropriately in accordance with the sporting good. Further, according to the swing analyzing apparatus of the present embodiment, since angular velocity sensors are used instead of a camera used in a system of related art, the configuration of the apparatus can be simplified and the apparatus can be readily handled.

1-3. Variations

The invention is not limited to the present embodiment but can be implemented in a variety of variations to the extent that they fall within the substance of the invention.

1-3-1. Variation 1

In the flowchart shown in FIG. 7, the state of impact is judged by comparing the greatest amount of change in angular velocity $\Delta\omega_{max}$ around the z axis (judgment axis) in the predetermined period T after the impact timing with the judgment levels L1 and L2. In contrast, the swing analyzing apparatus according to Variation 1 judges the state of impact based on the greatest angular velocity (greatest absolute value of angular velocity) around the z axis (judgment axis) in the predetermined period T after the impact timing. For example, in the case of the angular velocity data shown in FIG. 6, the greatest angular velocity $\omega_{max}$ in the predetermined period T after the impact timing $t_0$ is calculated. The state of impact is then judged based on the magnitude of the thus calculated $\omega_{max}$.

Figure 10:
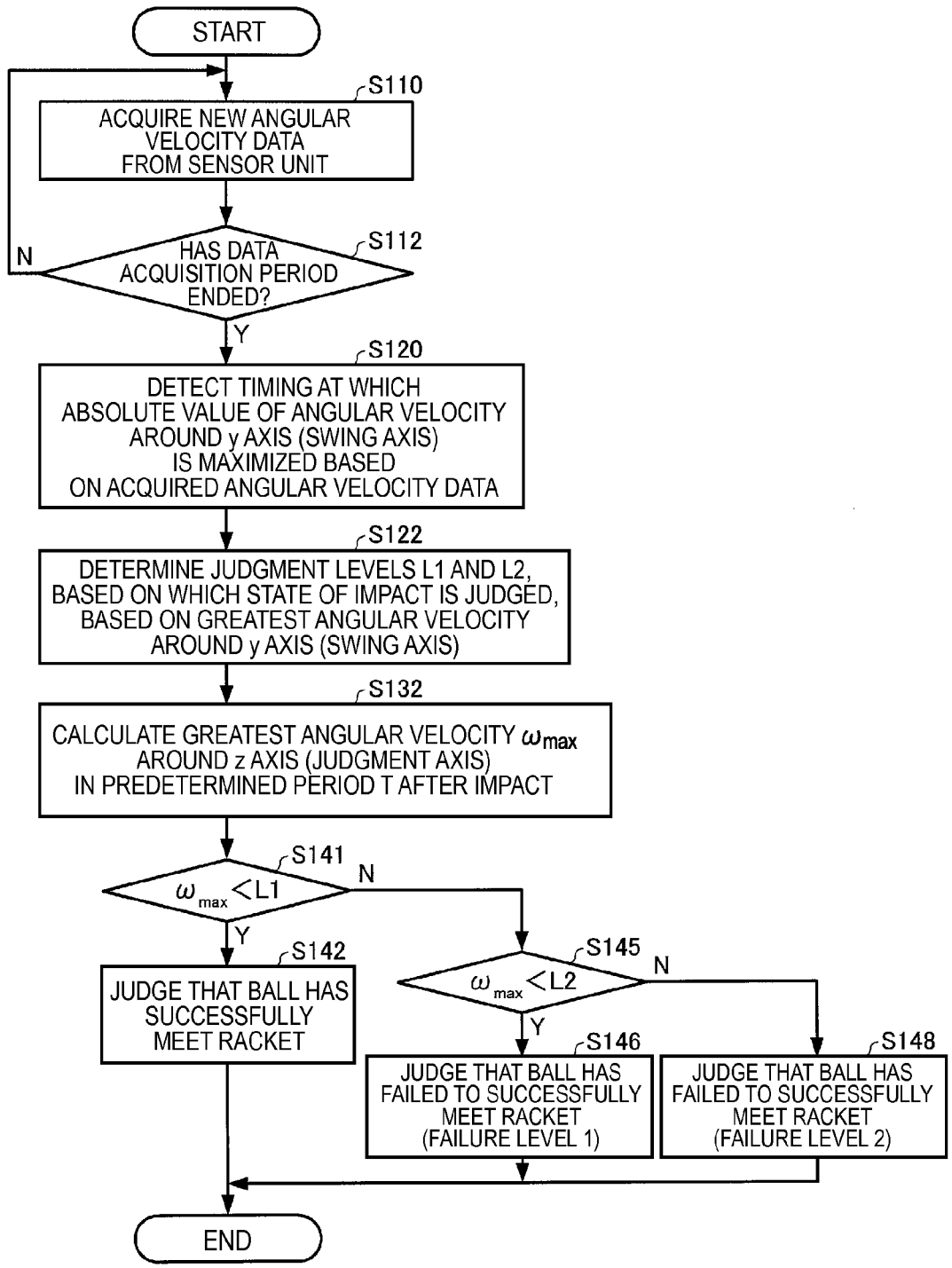
FIG. 10 shows a specific example of a flowchart according to which the state of impact is judged in Variation 1.

FIG. 10 shows a specific example of a flowchart according to which the processor in Variation 1 judges the state of impact in a swing of a tennis racket. In the example shown in FIG. 10, the state of impact is judged by using three levels. In FIG. 10, the processes in S110, S120, and S122 are the same as those in FIG. 7, and no description of these processes will therefore be made. The processor 200 calculates the greatest angular velocity $\omega_{max}$ around the z axis (judgment axis) in the predetermined period T after the impact timing detected in S120 (S132).

The processor 200 then compares $\omega_{max}$ with the judgment levels L1 and L2 determined in step S122. When $\omega_{max} < L1$ (Y in S141), the processor 200 judges that the tennis ball has successfully met (perfectly met, for example) the tennis racket (S142). When $L1 \le \omega_{max} \le L2$ (N in S141 and Y in S145), the processor 200 judges that the tennis ball has failed to successfully meet (slightly failed to perfectly meet, for example) the tennis racket (failure level 1) (S146). When $\omega_{max} \ge L2$ (N in S141 and N in S145), the processor 200 judges that the tennis ball has failed to successfully meet (substantially failed to perfectly meet, for example) the tennis racket (failure level 2) (S148).

As described above, rotational motion of a sporting good produced at the time of impact can be captured by calculating the greatest value of the angular velocity with respect to the judgment axis of the sporting good in a predetermined period immediately after the impact.

1-3-2. Variation 2

The present embodiment has been described with reference to the case where the swing and judgment axes coincide with the detection axes of particular ones of the angular velocity sensors 100, but they may not coincide with each other in some cases depending on the shape of a sporting good in question and the state of a swing. For example, when the sensor unit 10 is attached to the grip end of a tennis racket as shown in FIGS. 3A and 3B, and a tester swings the tennis racket with the ball hitting plane kept perpendicular to the swing plane, the z axis coincides with the judgment axis, whereas when the tester swings the tennis racket with the ball hitting plane kept inclined to the swing plane, the z axis may not coincide with the judgment axis in some cases. Further, when a tester tests a sporting good that does not allow the tester to identify any ball hitting plane, such as a baseball bat, and the tester does not fix the angle at which the tester grasps the sporting good, at least one of the swing axis and the judgment axis may not coincide with the detection axis of any of the angular velocity sensors 100 in some cases. To address the problem, a swing analyzing apparatus according to Variation 2 judges the state of impact by calculating the swing axis and the judgment axis based on the change in attitude of a sporting good.

Figure 11:
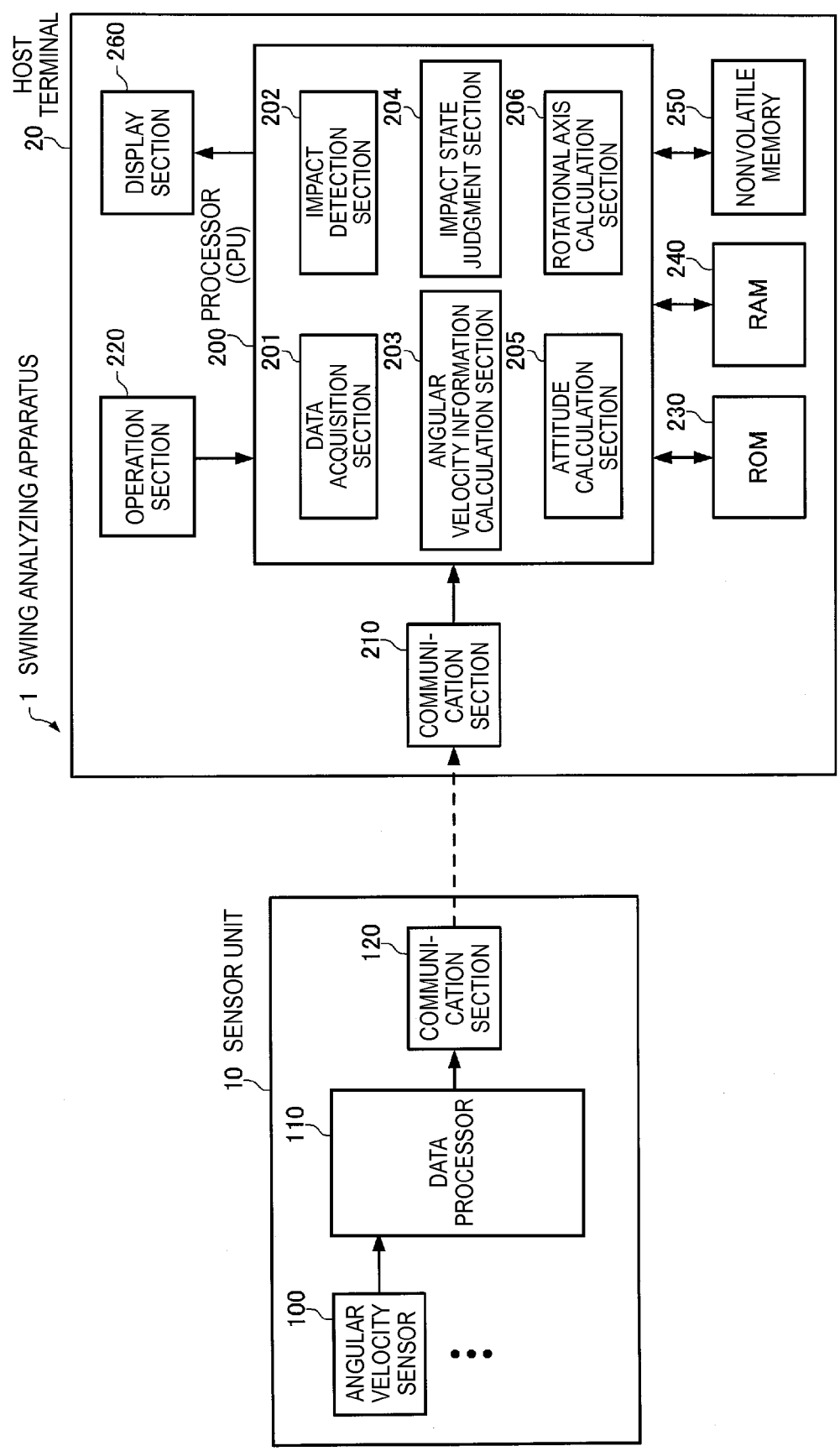
FIG. 11 shows the configuration of a swing analyzing apparatus according to Variation 2.

FIG. 11 shows the configuration of the swing analyzing apparatus according to Variation 2. In the swing analyzing apparatus 1 according to Variation 2, the sensor unit 10 includes, for example, three angular velocity sensors 100 that detect angular velocities along three axes (x, y, and z axes) in order to allow the processor 200 to calculate the attitude of a sporting good. The processor 200 functions not only as the data acquisition section 201, the impact detection section 202, the angular velocity information calculation section 203, and the impact state judgment section 204 but also as an attitude calculation section 205 and a rotational axis calculation section 206.

The attitude calculation section 205 calculates the attitude of a sporting good based on data outputted from the sensor unit 10 (angular velocity data around three axes). The rotational axis calculation section 206 calculates at least one of the judgment axis and the swing axis based on the information on the attitude of the sporting good calculated by the attitude calculation section 205. The other configurations of the swing analyzing apparatus according to Variation 2 are the same as those shown in FIG. 1, and no description thereof will be made.

All or part of the data acquisition section 201, the impact detection section 202, the angular velocity information calculation section 203, the impact state judgment section 204, the attitude calculation section 205, and the rotational axis calculation section 206 may be incorporated in the sensor unit 10.

Figure 12:
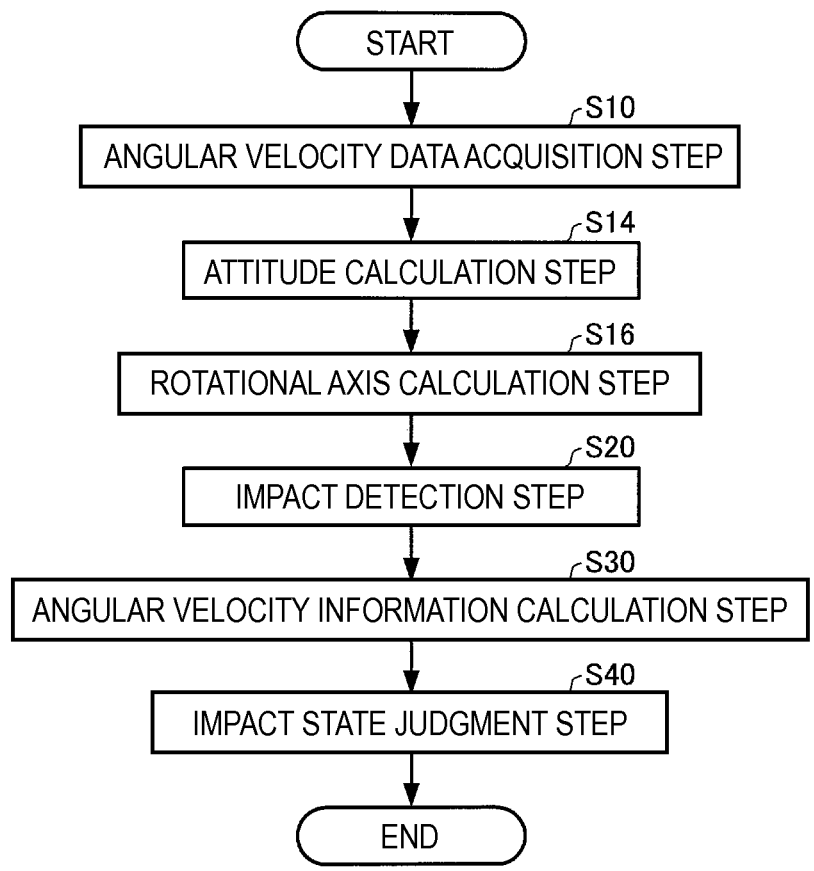
FIG. 12 is a flowchart showing exemplary processes performed by a processor in Variation 2.

FIG. 12 is a flowchart showing exemplary processes performed by the processor 200 in the swing analyzing apparatus 1 according to Variation 2. The processor 200 first operates as the data acquisition section 201 to acquire angular velocity data from the sensor unit 10 (S10, angular velocity data acquisition step).

The processor 200 then operates as the attitude calculation section 205 to calculate the attitude of the sporting good based on the angular velocity data acquired in S10 (S14, attitude calculation step). Since the sensor unit 10 is fixed to the sporting good, the attitude of the sensor unit 10 may alternatively be calculated as the attitude of the sporting good.

The processor 200 then operates as the rotational axis calculation section 206 to calculate at least one of the judgment axis and the swing axis (S16, rotational axis calculation step).

The processor 200 then operates as the impact detection section 202 to detect the impact timing (S20, impact detection step). For example, the processor 200 (impact detection section 202) detects, as the impact timing, the timing at which the magnitude of the angular velocity with respect to the swing axis calculated in S16 is maximized.

The processor 200 then operates as the angular velocity information calculation section 203 to calculate at least one of the amount of change in angular velocity around the judgment axis in a predetermined period after the impact timing and the greatest value of the angular velocity based on the angular velocity data acquired in S10 (S30, angular velocity information calculation step). For example, the processor 200 (angular velocity information calculation section 203) calculates at least one of the amount of change in angular velocity with respect to the judgment axis calculated in S16 and the greatest value of the angular velocity.

The processor 200 finally operates as the impact state judgment section 204 to judge the state of impact based on the calculation result in S30 (S40, impact state judgment step).

Figure 13:
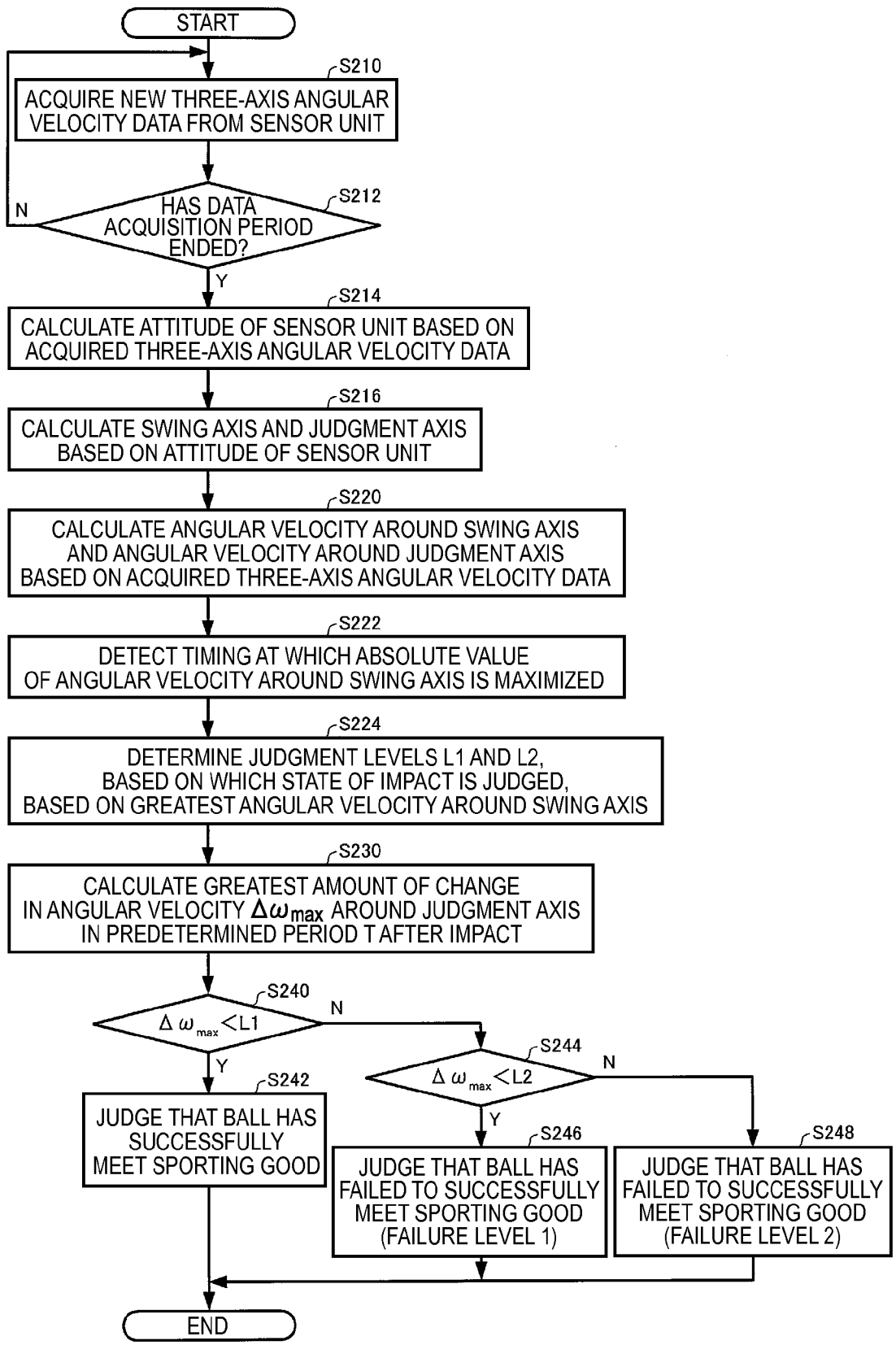
FIG. 13 shows a specific example of a flowchart according to which the state of impact is judged in Variation 2.

FIG. 13 shows a specific example of a flowchart according to which the processor 200 in Variation 2 judges the state of impact. In the example shown in FIG. 13, the state of impact is judged by using three levels. The processor 200 first periodically acquires new three-axis angular velocity data from the sensor unit 10 until a data acquisition period ends (N in S212) (S210).

The processor 200 then calculates the attitude of the sensor unit 10 based on the three-axis angular velocity data acquired in S210 (S214). For example, the attitude of the sensor unit 10 is calculated by appropriately defining an initial attitude of the sensor unit 10 in the xyz coordinate system and accumulating the change in attitude of the sensor unit 10 from the initial attitude thereof in the xyz coordinate system based on the time-series three-axis angular velocity data. The initial attitude may alternatively be determined by providing a three-axis acceleration sensor in the sensor unit 10 and detecting the direction of gravitational acceleration when the sporting good is stationary.

The processor 200 then calculates the swing axis and the judgment axis based on the information on the attitude of the sensor unit 10 calculated in S214 (S216). For example, the central axis of the rotational motion of the sensor unit 10 produced by a swing is calculated based on the change in attitude of the sensor unit 10 in the xyz coordinate system. The thus calculated central axis is the swing axis. Further, since the attitude of the sensor unit 10 in the xyz coordinate system changes at the time of impact, the judgment axis can be calculated based on the direction in which the attitude changes.

The processor 200 then calculates the angular velocity around the swing axis and the angular velocity around the judgment axis based on the three-axis angular velocity data acquired in S210 (S220). Since the angular velocity data with respect to the x, y, and z axes and the swing axis and the judgment axis in the xyz coordinate system are known, the angular velocity around the swing axis and the angular velocity around the judgment axis can be calculated by performing known calculation.

The processor 200 then detects the timing at which the absolute value of the angular velocity around the swing axis is maximized (impact timing) (S222).

The processor 200 then determines judgment levels L1 and L2, based on which the state of impact is judged, based on the greatest angular velocity (greatest absolute value of angular velocity) around the swing axis (S224).

The processor 200 then calculates the greatest amount of change in angular velocity $\Delta\omega_{max}$ around the judgment axis in the predetermined period T after the impact timing detected in S222 (S230).

The processor 200 then compares $\Delta\omega_{max}$ with the judgment levels L1 and L2 determined in step S224. When $\Delta\omega_{max}$<L1 (Y in S240), the processor 200 judges that a ball has successfully met (perfectly met, for example) the sporting good (S242). When L1≤$\Delta\omega_{max}$<L2 (N in S240 and Y in S244), the processor 200 judges that the ball has failed to successfully meet (slightly failed to perfectly meet, for example) the sporting good (failure level 1) (S246). When $\Delta\omega_{max}$≥L2 (N in S240 and N in S244), the processor 200 judges that the ball has failed to successfully meet (substantially failed to perfectly meet, for example) the sporting good (failure level 2) (S248).

As described above, the swing axis and the judgment axis can be calculated irrespective of the shape of a sporting good and the state of a swing by calculating the attitude of the sensor unit 10 (that is, attitude of sporting good), whereby the state of impact can be judged with precision.

S210 and S212 in the flowchart in FIG. 13 correspond to S10 in the flowchart in FIG. 12 (angular velocity data acquisition step). S214 in the flowchart in FIG. 13 corresponds to S14 in the flowchart in FIG. 12 (attitude calculation step). S216 in the flowchart in FIG. 13 corresponds to S16 in the flowchart in FIG. 12 (rotational axis calculation step). S220 and S222 in the flowchart in FIG. 13 correspond to S20 in the flowchart in FIG. 12 (impact detection step). S230 in the flowchart in FIG. 13 corresponds to S30 in the flowchart in FIG. 12 (angular velocity information calculation step). S240, S242, S244, S246, and S248 in the flowchart in FIG. 13 correspond to S40 in the flowchart in FIG. 12 (impact state judgment step).

1-3-3. Other Variations

For example, in the swing analyzing apparatus according to the present embodiment, the sensor unit 10 is wirelessly connected or wired to the host terminal 20, as shown in FIG. 1. Alternatively, each of the sensor unit 10 and the host terminal 20 may be provided with an interface for a memory card. In this case, the sensor unit 10 writes data outputted from the angular velocity sensors 100 onto the memory card, and the host terminal 20 then reads the data from the memory card and judges the state of impact. Still alternatively, the functions of the processor 200 in the host terminal 20 may be incorporated in the sensor unit 10.

Further, in the swing analyzing apparatus according to the present embodiment, the state of impact is judged after all angular velocity data that the processor 200 requires are acquired. Alternatively, the state of impact may be judged in real time whenever the processor 200 acquires angular velocity data.

Further, in the swing analyzing apparatus according to the present embodiment, the impact timing is detected based on the angular velocity around the swing axis. The impact timing may alternatively be detected, for example, by attaching an acceleration sensor to a sporting good in such a way that the detection axis of the acceleration sensor is perpendicular to the ball hitting plane of the sporting good and detecting, for example, the timing at which the acceleration is maximized based on data outputted from the acceleration sensor. In the case of a sporting good that does not allow a user to identify any ball hitting plane, a three-axis acceleration sensor may be attached to the sporting good (a two-axis acceleration sensor may be used depending on the position where the acceleration sensor is attached), and an acceleration vector in a predetermined position on the sporting good is calculated. The impact timing can then be detected based on the magnitude of the acceleration vector.

Further, the swing analyzing apparatus according to the present embodiment judges the state of impact based on the angular velocity around the judgment axis immediately after the impact, but whether or not a ball has met a sweet spot cannot be accurately judged in some cases. For example, when a tennis racket is swung and a ball meets the tennis racket in a position on the major axis thereof other than a sweet spot, the swing analyzing apparatus can erroneously judge that the ball has successfully met the tennis racket because the amount of change in angular velocity around the judgment axis is small. In general, when a ball meets a sporting good in a position apart from a sweet spot, vibration produced in the sporting good is believed to be large. It is also believed that the magnitude of the vibration can be detected based on the change in angular velocity around the swing axis immediately after the impact. In view of the fact, whether or not the ball has met the sweet spot may be judged or how much the position where the ball has met the sporting good is apart from the sweet spot may be judged based on the angular velocity around the judgment axis and the angular velocity around the swing axis immediately after the impact.

The scope of the invention encompasses substantially the same configurations as the configuration described in the above embodiment (for example, a configuration having the same function, using the same method, and providing the same result and a configuration having the same purpose and providing the same effect). Further, the scope of the invention encompasses a configuration in which an inessential portion of the configuration described in the above embodiment is replaced. Moreover, the scope of the invention encompasses a configuration that provides the same advantageous effect as that provided in the configuration described in the above embodiment or a configuration that can achieve the same purpose. Further, the scope of the invention encompasses a configuration in which a known technology is added to the configuration described in the above embodiment.

2. Second Embodiment

A second embodiment of the invention will be described below in detail with reference to the drawings. The embodiment described below is not intended to inappropriately limit the contents of the invention set forth in the claims. Further, all the configurations described below are not necessarily essential in the invention.

2-1. Configuration of Swing Analyzing Apparatus

Figure 14:
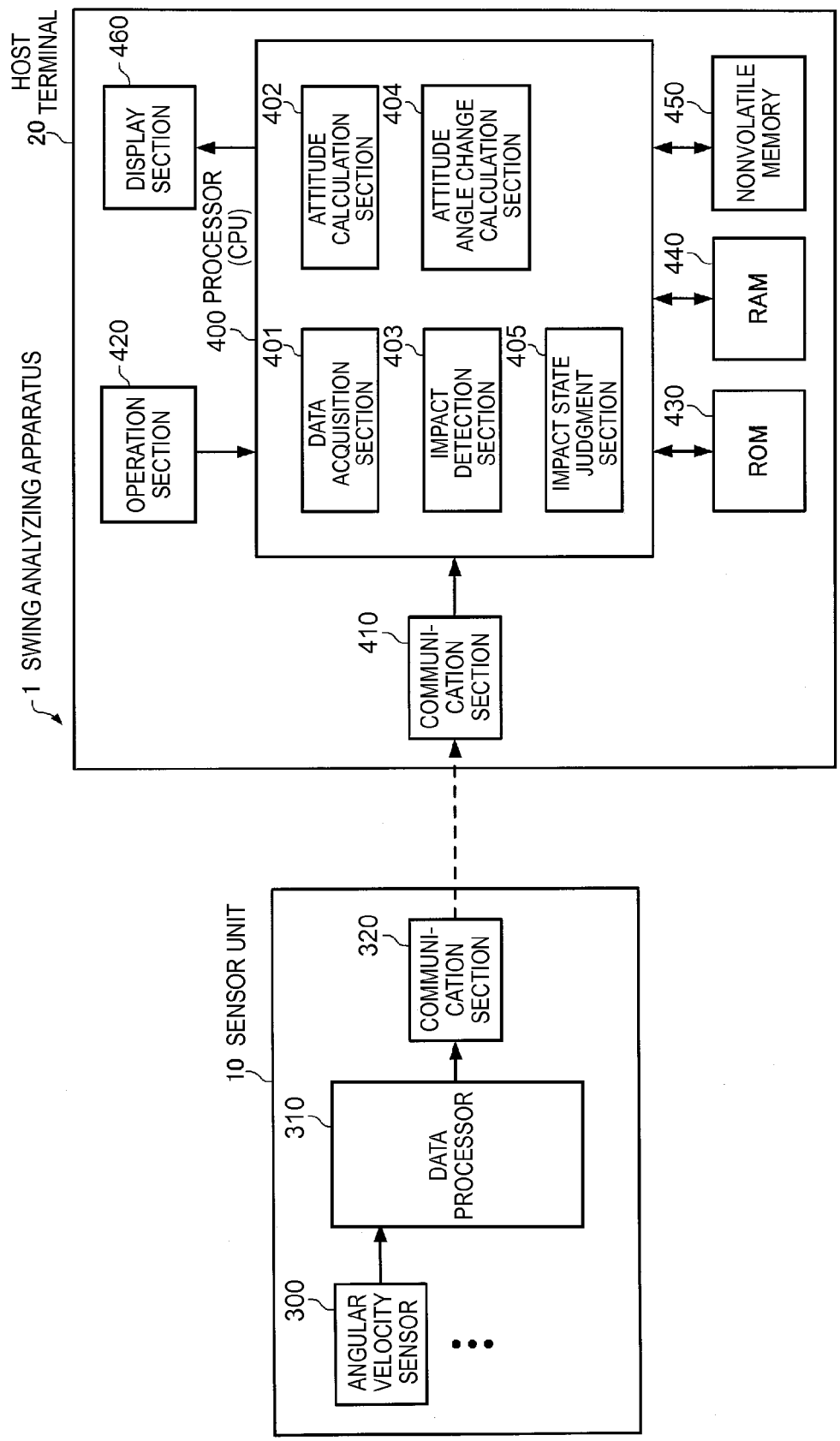
FIG. 14 shows the configuration of a swing analyzing apparatus according to a second embodiment.

FIG. 14 shows the configuration of a swing analyzing apparatus according to the present embodiment. A swing analyzing apparatus 1 according to the present embodiment includes one or more sensor units 10 and a host terminal 20. The sensor unit 10 and the host terminal 20 may be wirelessly connected or wired to each other.

The sensor unit 10 is attached to a sporting good that undergoes swing analysis. In the present embodiment, the sensor unit 10 includes one or more angular velocity sensors 300, a data processor 310, and a communication section 320.

Each of the angular velocity sensors 300 detects the angular velocity around a detection axis thereof and outputs a signal according to the magnitude of the detected angular velocity (angular velocity data). In the swing analyzing apparatus 1 according to the present embodiment, the sensor unit 10 includes, for example, three angular velocity sensors 300 that detect angular velocities along three axes (x, y, and z axes) in order to allow the host terminal 20 to calculate the attitude of the sporting good.

The data processor 310 synchronizes the data outputted from the angular velocity sensors 300 with each other and outputs packets obtained by combining the data with time stamps and other information to the communication section 320. The data processor 310 may be configured to further perform bias correction and temperature correction on the angular velocity sensors 300. The functions of bias correction and temperature correction may alternatively be incorporated in each of the angular velocity sensors 300.

The communication section 320 sends the packet data received from the data processor 310 to the host terminal 20.

The host terminal 20 includes a processor (CPU) 400, a communication section 410, an operation section 420, a ROM 430, a RAM 440, a nonvolatile memory 450, and a display section 460. The host terminal 20 can be formed of a personal computer (PC) or a smart phone or any other similar mobile apparatus.

The communication section 410 receives data sent from the sensor unit 10 and sends the data to the processor 400.

The operation section 420 acquires data according to user's operation and sends the data to the processor 400. The operation section 420 is formed, for example, of a touch-panel display, buttons, keys, or a microphone.

The ROM 430 stores, for example, a program that instructs the processor 400 to perform a variety of computation and control operation and a variety of programs and data for performing application functions.

The ROM 440 is a storage section that is used as a work area used by the processor 400 and temporarily stores programs and data read from the ROM 430, data inputted through the operation section 420, results computed by the processor 400 in accordance with a variety of programs, and other information.

The nonvolatile memory 450 is a recording section that records part of data produced in processes performed by the processor 400, specifically, data required to be saved for a long period.

The display section 460 displays the results processed by the processor 400 in the form of character, graph, and other images. The display section 460 is, for example, a CRT, an LCD, a touch-panel display, or an HMD (head mount display). A single touch-panel display may alternatively serve as both the operation section 420 and the display section 460.

The processor 400 performs a variety of computation and control operation on data received from the sensor unit 10 via the communication section 410 (such as display and control operation on display section 460) in accordance with the programs stored in the ROM 440.

In the present embodiment, the processor 400 functions as a data acquisition section 401, an impact detection section 403, an attitude calculation section 402, an attitude angle change calculation section 404, and an impact state judgment section 405, which will be described below. The processor 400 in the present embodiment may be configured not to have part of the functions described above.

The data acquisition section 401 acquires data outputted from the sensor unit 10 (angular velocity data) and received via the communication section 410. The acquired data are stored, for example, in the RAM 440.

The impact detection section 403 detects the timing of impact in a swing of a sporting good (hereinafter simply referred to as "impact").

The attitude calculation section 402 calculates the attitude of the sporting good based on data outputted from the sensor unit 10 (angular velocity data around three axes).

The attitude angle change calculation section 404 calculates the amount of change in attitude angle of the sporting good in a predetermined period after the impact timing based on the result calculated by the attitude calculation section 402.

The impact state judgment section 405 judges the state of impact based on the result calculated by the attitude angle change calculation section 404.

All or part of the data acquisition section 401, the impact detection section 403, the attitude calculation section 402, the attitude angle change calculation section 404, and the impact state judgment section 405 may be incorporated in the sensor unit 10.

Figure 15:
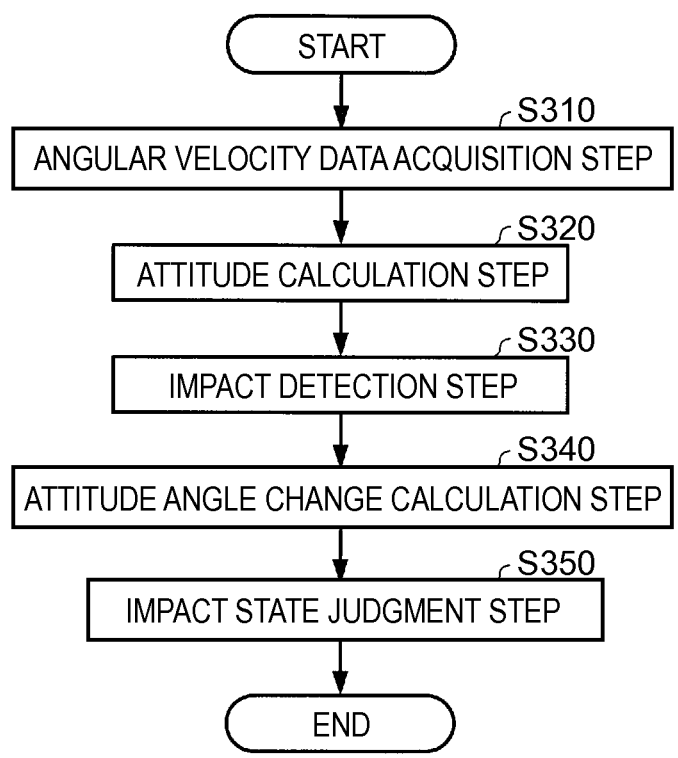
FIG. 15 is a flowchart showing exemplary processes performed by a processor in the second embodiment.

FIG. 15 is a flowchart showing exemplary processes performed by the processor 400. The processor 400 first operates as the data acquisition section 401 to acquire angular velocity data from the sensor unit 10 (S310, angular velocity data acquisition step).

The processor 400 then operates as the attitude calculation section 402 to calculate the attitude of the sporting good based on the angular velocity data acquired in S310 (S320, attitude calculation step). Since the sensor unit 10 is fixed to the sporting good, the attitude of the sensor unit 10 may alternatively be calculated as the attitude of the sporting good, or the attitude of a predetermined portion of the sporting good (the angle of the ball hitting plane, for example) may be calculated based on the attitude of the sensor unit 10.

The processor 400 then operates as the impact detection section 403 to detect the impact timing (S330, impact detection step). For example, the processor 400 (impact detection section 403) may detect the timing at which the magnitude of the angular velocity with respect to the axis around which the sporting good is swung (hereinafter referred to as "swing axis") is maximized by detecting the greatest magnitude of the angular velocity with respect to the swing axis based on the data outputted from the sensor unit 10 (angular velocity data), and the processor 400 may set the detected timing as the impact timing. The sensor unit 10 may be so attached to the sporting good that the detection axis of any of the angular velocity sensors 300 coincides with the swing axis.

The processor 400 then operates as the attitude angle change calculation section 404 to calculate the amount of change in attitude angle of the sporting good in a predetermined period after the impact timing based on the information on the attitude of the sporting good calculated in S320 (S340, attitude angle change calculation step). The sensor unit 10 may be so attached to the sporting good that the detection axis of any of the angular velocity sensors 300 is an axis with respect to which the attitude angle of the sporting good is calculated.

The processor 400 finally operates as the impact state judgment section 405 to judge the state of impact based on the calculation result in S340 (S350, impact state judgment step). For example, the processor 400 (impact state judgment section 405) may variably set, in accordance with the greatest magnitude of the angular velocity with respect to the swing axis, a judgment reference based on which the state of impact is judged. Further, for example, the processor 400 (impact state judgment section 405) may judge the state of impact by using a plurality of levels. The processor 400 may then, for example, display the result of judgment of the state of impact on the display section 460 or output the result in the form of audio.

2-2. Specific Example

A method according to the present embodiment will next be described with reference to the first embodiment, where the state of impact in a swing of a tennis racket is judged. FIG. 3A shows that a tester swings a tennis racket 2 and hits a tennis ball 3 with the tennis racket 2 in a position on the major axis thereof (indicated by long dashed short dashed line). On the other hand, FIG. 3B shows that the tester swings the tennis racket 2 and hits the tennis ball 3 with the tennis racket 2 in a position shifted downward from the major axis thereof (indicated by long dashed short dashed line). When the tennis ball 3 meets the tennis racket 2 in a position on the major axis thereof (when the tennis ball 3 perfectly meets the tennis racket 2), substantially no rotation around the major axis is produced, whereas when the tennis ball 3 meets the tennis racket 2 in a position shifted from the major axis (when the tennis ball 3 fails to successfully meet the tennis racket 2), rotation around the major axis (arrow in FIG. 3B) is produced immediately after the impact. Whether or not the tennis ball 3 meets the tennis racket 2 in a position on the major axis thereof can therefore be judged based on the amount of change in attitude angle of an axis perpendicular to the major axis immediately after the impact. An axis that allows the state of impact to be judged based on the amount of change in attitude angle immediately after the impact, such as an axis perpendicular to the major axis of the tennis racket 2, is hereinafter referred to as a "judgment axis."

Further, the impact timing can be judged based on the angular velocity around the swing axis. When the tennis racket 2 is swung, an axis perpendicular to the major axis of the tennis racket 2 and oriented upward may be considered as the swing axis. When the tennis racket is swung, the absolute value of the angular velocity around the swing axis gradually increases during a period from the start of the swing to the instant of impact, and at the instant of impact, when the tennis ball 3 meets the tennis racket 2, the absolute value of the angular velocity around the swing axis decreases. That is, the impact timing can be detected based on the fact that the absolute value of the angular velocity around the swing axis is maximized immediately before the impact.

To capture the angular velocity around the swing axis and the attitude angle of the judgment axis, for example, the sensor unit 10 including three angular velocity sensors capable of detecting angular velocities along three axes perpendicular to one another (x, y, and z axes) is so attached to the grip end of the tennis racket 2 that, for example, the x axis is perpendicular to the ball hitting plane and the z axis coincides with the major axis of the tennis racket 2. In this configuration, the impact timing can be detected based on the greatest value of the angular velocity around the y axis (swing axis), and the state of impact can be judged based on the amount of change in attitude angle of the x or z axis (judgment axis) immediately after the impact. The sensor unit 10 is not necessarily attached to the grip end of the tennis racket 2 but can be attached to an arbitrary portion where the attached sensor unit 10 does not interfere with a swing.

Figure 16:
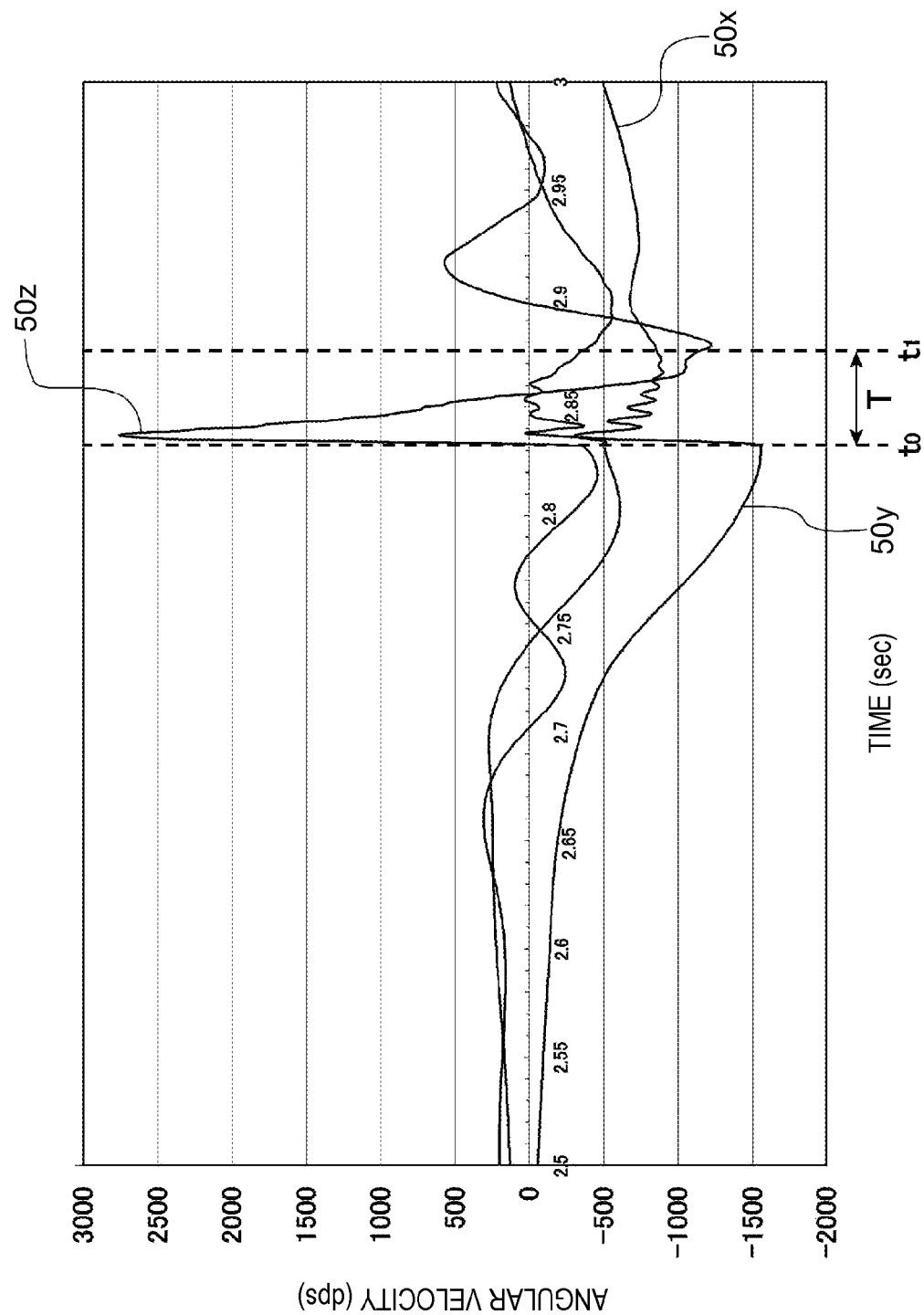
FIG. 16 shows an example of angular velocity data measured when a tennis ball fails to successfully meet a tennis racket in the second embodiment.

FIG. 16 shows an example of measured three-axis angular velocity data. Reference characters 50x, 50y, and 50z denote angular velocity data around the x, y, and z axes, respectively. Time $t_0$, when the absolute value of the angular velocity around the y axis is maximized, is the impact timing. The data shown in FIG. 16 are obtained when the tennis ball 3 has failed to successfully meet the tennis racket 2 and shows that the angular velocity around the z axis greatly changes immediately after the impact. That is, when the tennis ball fails to successfully meet the tennis racket, the attitude angles of the x and y axes immediately after the impact are believed to change greatly. The amount of change in attitude angle measured when the tennis ball fails to successfully meet the tennis racket changes in accordance with the weight of the tennis racket 2. For example, when the tennis racket 2 is light, the amount of change in attitude angle measured when the tennis ball 3 fails to successfully meet the tennis racket 2 increases, whereas when the tennis racket 2 is heavy, the amount of change in attitude angle measured when the tennis ball 3 fails to successfully meet the tennis racket 2 decreases.

Figure 17:
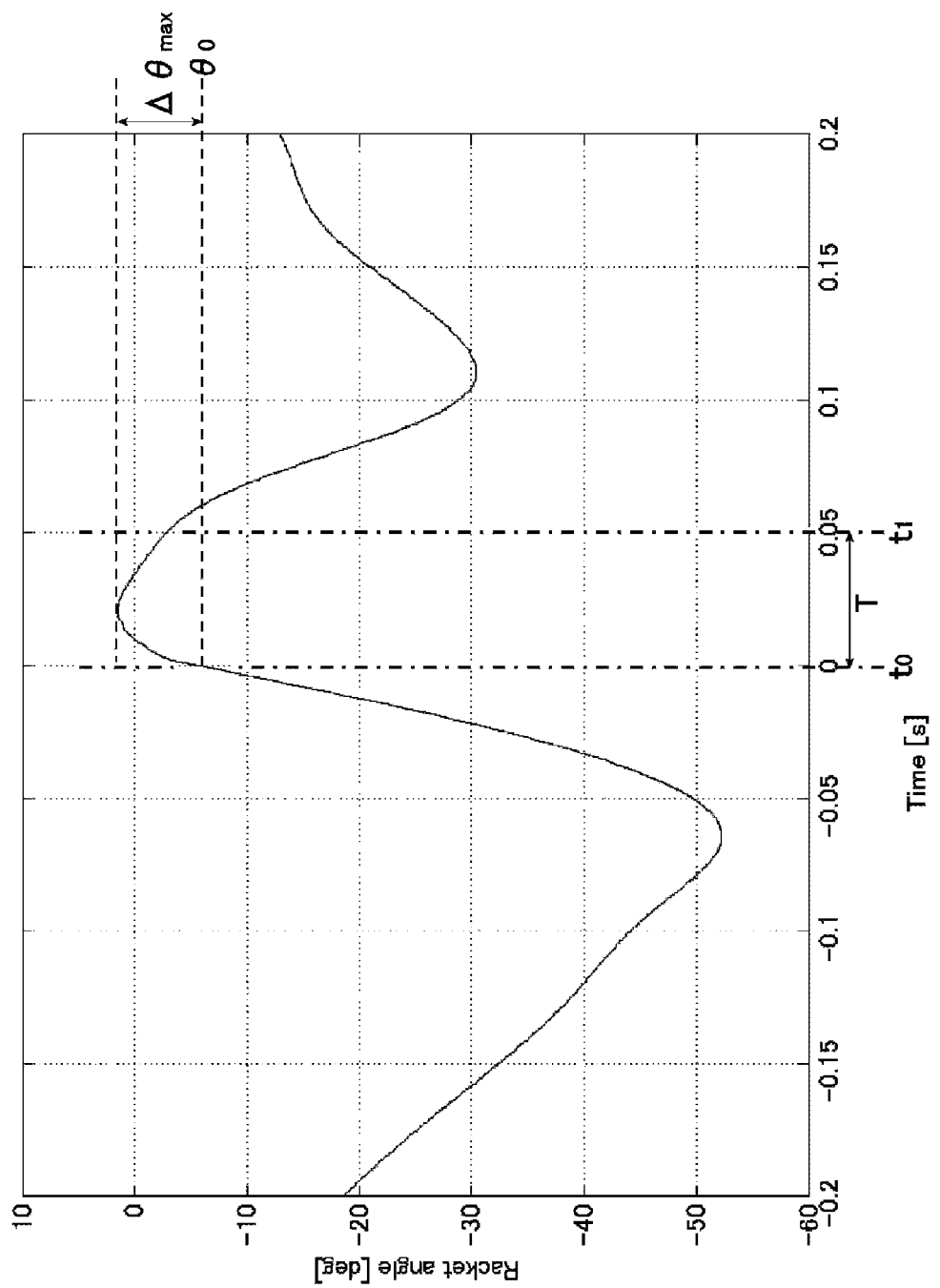
FIG. 17 shows an example of the attitude angle of a tennis racket measured when a tennis ball perfectly meets the tennis racket in the second embodiment.
Figure 18:
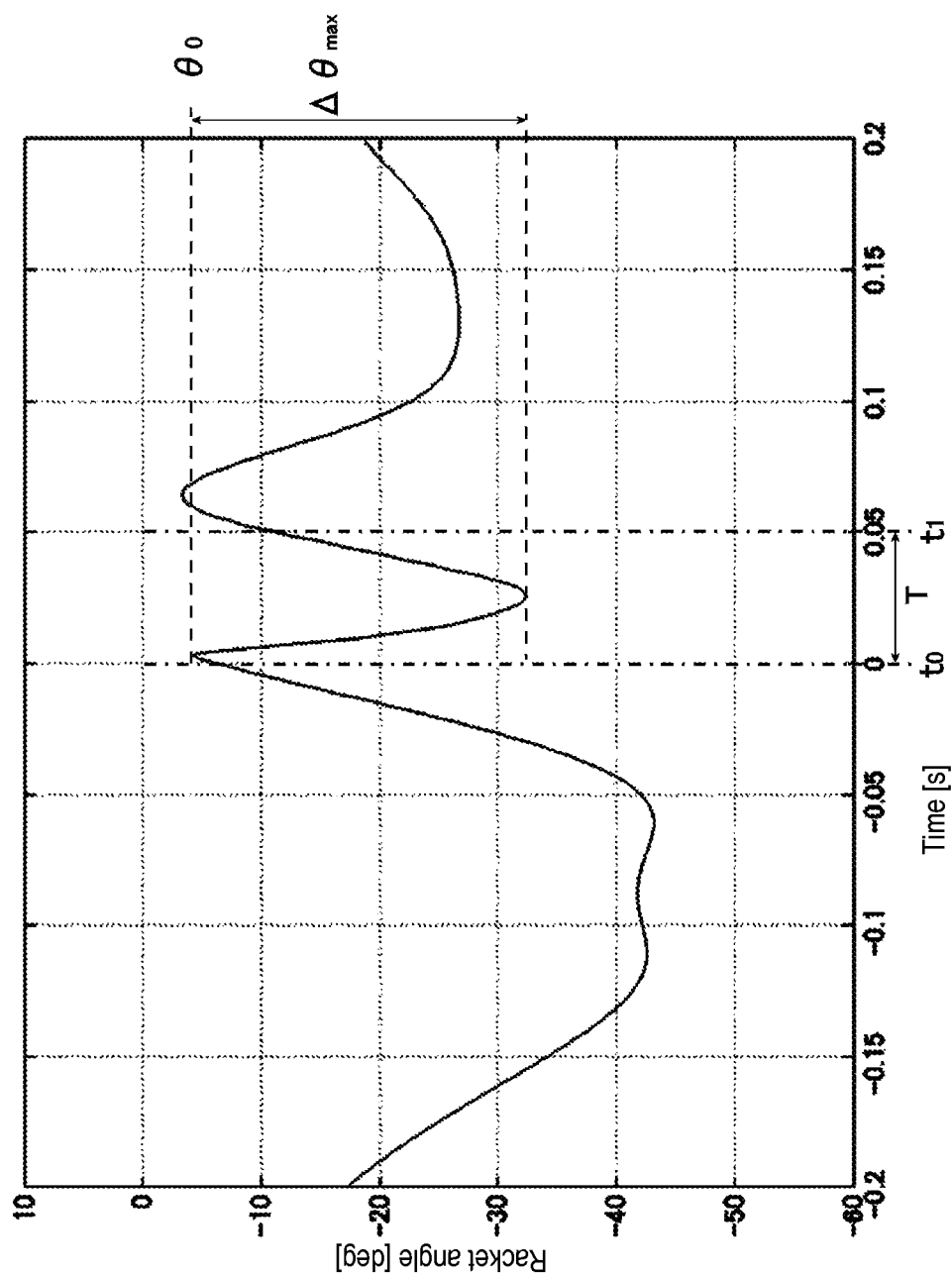
FIG. 18 shows an example of the attitude angle of the tennis racket measured when the tennis ball fails to successfully meet the tennis racket in the second embodiment.

FIGS. 17 and 18 are graphs obtained by calculating the angle of the ball hitting plane (face) of the tennis racket 2 based on three-axis angular velocities measured when the tennis ball 3 perfectly meets the tennis racket 2 and when the tennis ball 3 fails to successfully meet the tennis racket 2. The angle of the ball hitting plane (face) of the tennis racket 2 corresponds to the attitude angle of the y axis. Comparison between FIGS. 17 and 18 shows that the amount of change in attitude angle of the y axis immediately after the impact greatly differs one from to the other and that the amount of change measured when the tennis ball fails to successfully meet the tennis racket is greater than the other. In the present embodiment, the amount of change in attitude angle of the x or y axis in the period from the time $t_0$, at which the impact occurs, to time $t_1$ after a predetermined period T (0.05 seconds, for example) is calculated. Specifically, the greatest amount of change in attitude angle $\Delta\theta_{max}$ in the predetermined period T is calculated with reference to an attitude angle $\theta_0$ of the x or y axis at the impact timing $t_0$. The state of impact is then judged based on the magnitude of the thus calculated $\Delta\theta_{max}$.

Figure 19:
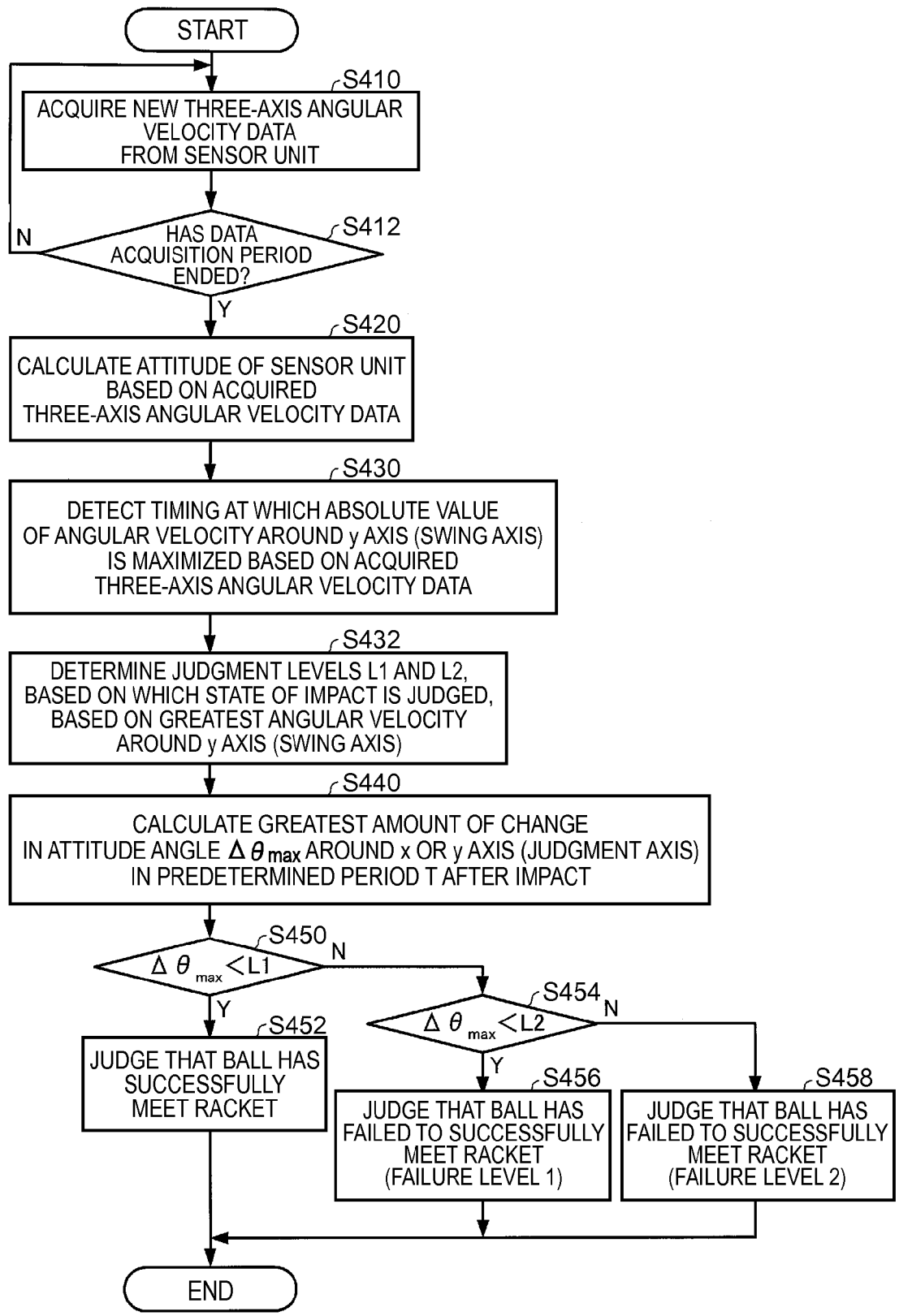
FIG. 19 shows a specific example of a flowchart according to which the state of impact is judged in the second embodiment.

FIG. 19 shows a specific example of a flowchart according to which the processor 400 judges the state of impact. In the example shown in FIG. 19, the state of impact is judged by using three levels. The processor 400 first periodically acquires new three-axis angular velocity data from the sensor unit 10 until a data acquisition period ends (N in S412) (S410). The data acquisition period is a predetermined period including at least periods before and after the impact, for example, may be a period from the start of a swing to the end of the swing or may include a stationary period before a swing starts and a stationary period after the swing ends.

The processor 400 then calculates the attitude of the sensor unit 10 based on the three-axis angular velocity data acquired in S410 (S420). For example, the attitude of the sensor unit 10 is calculated by appropriately defining an initial attitude of the sensor unit 10 in the xyz coordinate system and accumulating the change in attitude of the sensor unit 10 from the initial attitude thereof in the xyz coordinate system based on the time-series three-axis angular velocity data. The initial attitude may alternatively be determined by providing a three-axis acceleration sensor in the sensor unit 10 and detecting the direction of gravitational acceleration when the sporting good is stationary.

The processor 400 then detects the timing at which the absolute value of the angular velocity around the y axis (swing axis) is maximized (impact timing) based on the three-axis angular velocity data acquired in S410 (S430).

The processor 400 then determines judgment levels (judgment references) L1 and L2, based on which the state of impact is judged, based on the greatest angular velocity (greatest absolute value of angular velocity) around the y axis (swing axis) (S432). That is, since the magnitude of the greatest angular velocity (swing speed) around the y axis (swing axis) is believed to correlate with the magnitude of the amount of change in attitude angle of the x or y axis (judgment axis) immediately after the impact, the judgment levels L1 and L2, based on which the state of impact is judged, are variably set in accordance with the swing speed.

The processor 400 then calculates the greatest amount of change in attitude angle of the x or y axis (judgment axis) $\Delta\theta_{max}$ in the predetermined period T after the impact timing detected in S430 (S440).

The processor 400 then compares $\Delta\theta_{max}$ with the judgment levels L1 and L2 determined in step S432. When $\Delta\theta_{max}<L1$ (Y in S450), the processor 400 judges that the ball has successfully met (perfectly met, for example) the tennis racket (S452). When $L1 \leq \Delta\theta_{max}<L2$ (N in S450 and Y in S454), the processor 400 judges that the ball has failed to successfully meet (slightly failed to perfectly meet, for example) the tennis racket (failure level 1) (S456). When $\Delta\theta_{max} \geq L2$ (N in S450 and N in S454), the processor 400 judges that the ball has failed to successfully meet (substantially failed to perfectly meet, for example) the tennis racket (failure level 2) (S458). As described above, setting a plurality of judgment levels allows a user to obtain information not only on whether or not the user has successfully hit the tennis ball but also, when the user has failed to successfully hit the tennis ball, on how much the user has failed.

S410 and S412 in the flowchart in FIG. 19 correspond to S310 in the flowchart in FIG. 15 (angular velocity data acquisition step). S420 in the flowchart in FIG. 19 corresponds to S320 in the flowchart in FIG. 15 (attitude calculation step). S430 in the flowchart in FIG. 19 corresponds to S330 in the flowchart in FIG. 15 (impact detection step). S440 in the flowchart in FIG. 19 corresponds to S340 in the flowchart in FIG. 15 (attitude angle change calculation step). S450, S452, S454, S456, and S458 in the flowchart in FIG. 19 correspond to S350 in the flowchart in FIG. 15 (impact state judgment step).

The present embodiment has been described with reference to the case where the swing axis and the judgment axis coincide with the detection axes of particular ones of the angular velocity sensors 300, but they may not coincide with each other in some cases depending on the position in which or the angle at which the sensor unit 10 is attached. In such a case, correction parameters having been created in advance may be used to correct the discrepancy between the swing and judgment axes and the detection axes.

The method according to the present embodiment, which has been described with reference to the case where the sporting good is a tennis racket, is also applicable as in the first embodiment to other sporting goods (such as bat and golf club) as long as the swing and judgment axes are appropriately defined in accordance with a sporting good in question.

As described above, according to the swing analyzing apparatus of the present embodiment, rotational motion of a sporting good produced at the time of impact can be captured by calculating the greatest amount of change in attitude angle of the judgment axis in a predetermined period immediately after the impact. The state of the impact can therefore be subjectively judged by selecting the judgment axis appropriately in accordance with the sporting good. Further, according to the swing analyzing apparatus of the present embodiment, since angular velocity sensors are used instead of a camera used in a system of related art, the configuration of the apparatus can be simplified and the apparatus can be readily handled.

2-3. Variations

The invention is not limited to the present embodiment but can be implemented in a variety of variations to the extent that they fall within the substance of the invention.

2-3-1. Variation 1

The second embodiment has been described with reference to the case where the swing and judgment axes coincide with the detection axes of particular ones of the angular velocity sensors 300, but they may not coincide with each other in some cases depending on the shape of a sporting good in question and the state of a swing. For example, when the sensor unit 10 is attached to the grip end of a tennis racket as shown in FIGS. 3A and 3B, and a tester swings the tennis racket with the ball hitting plane kept perpendicular to the swing plane, the y axis coincides with the judgment axis, otherwise the y axis may not coincide with the judgment axis in some cases. Further, when a tester tests a sporting good that does not allow the tester to identify any ball hitting plane, such as a baseball bat, and the tester does not fix the angle at which the tester grasps the sporting good, at least one of the swing axis and the judgment axis may not coincide with the detection axis of any of the angular velocity sensors 300 in some cases. To address the problem, a swing analyzing apparatus according to Variation 1 judges the state of impact by calculating the swing axis and the judgment axis based on the change in attitude of a sporting good.

Figure 20:
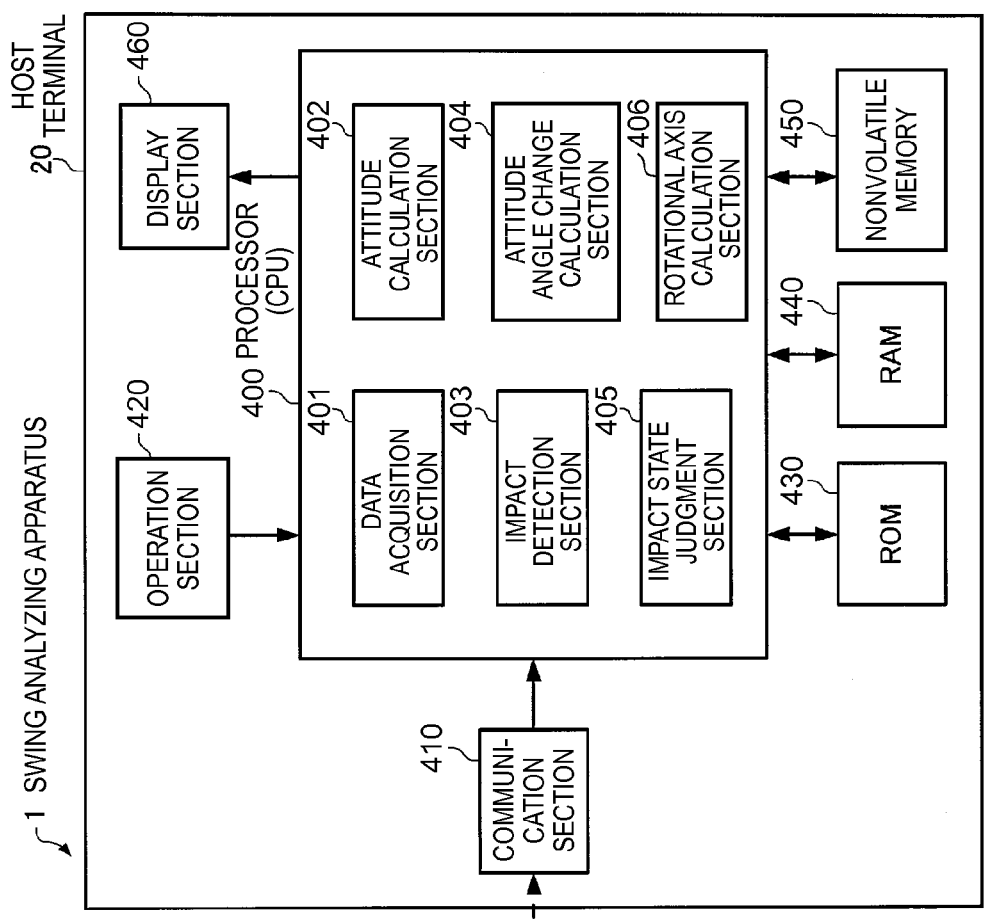
FIG. 20 shows the configuration of a swing analyzing apparatus according to a variation of the second embodiment.
Figure 20:
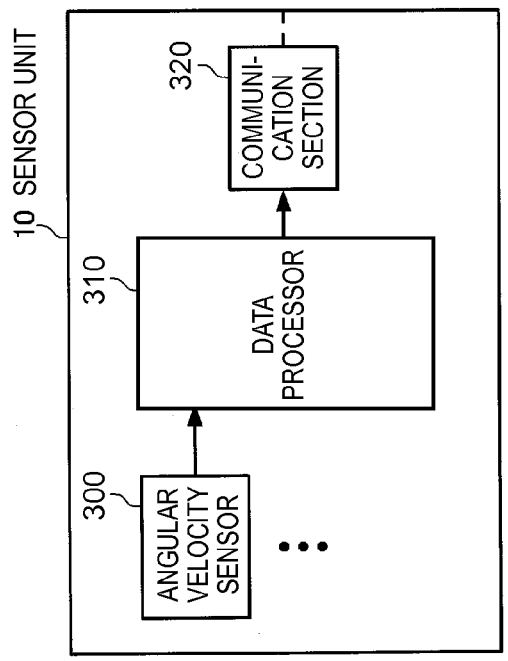

FIG. 20 shows the configuration of the swing analyzing apparatus according to Variation 1. In the swing analyzing apparatus 1 according to Variation 1, the processor 400 functions not only as a data acquisition section 401, an attitude calculation section 402, an impact detection section 403, an attitude angle change calculation section 404, and an impact state judgment section 405 but also as a rotational axis calculation section 406.

The rotational axis calculation section 406 calculates at least one of the judgment axis (axis with respect to which attitude angle is calculated) and the swing axis based on the information on the attitude of a sporting good calculated by the attitude calculation section 405. The other configurations of the swing analyzing apparatus according to Variation 1 are the same as those shown in FIG. 14, and no description thereof will be made.

All or part of the data acquisition section 401, the attitude calculation section 402, the impact detection section 403, the attitude angle change calculation section 404, the impact state judgment section 405, and the rotational axis calculation section 406 may be incorporated in the sensor unit 10.

Figure 21:
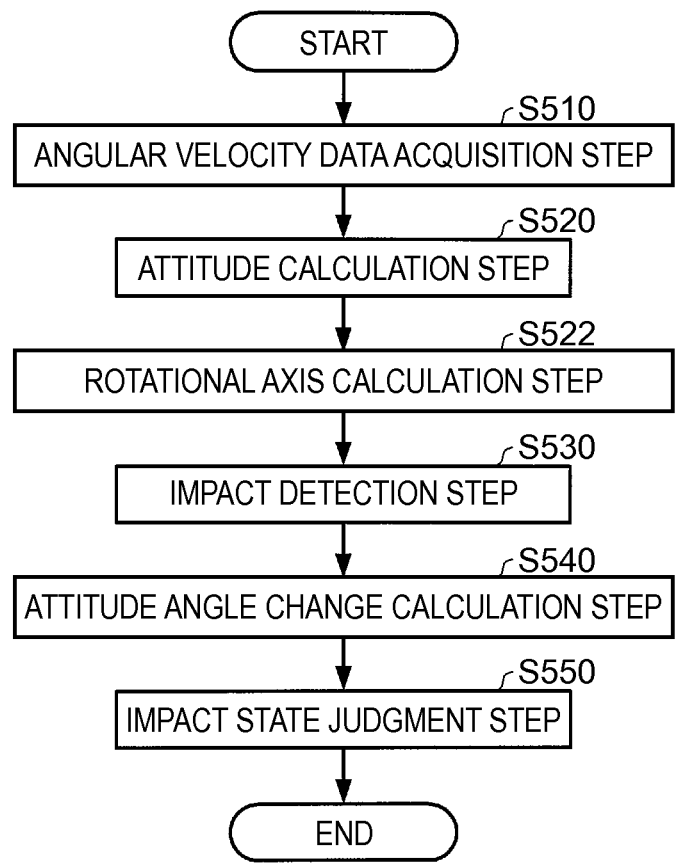
FIG. 21 is a flowchart showing exemplary processes performed by a processor in the variation of the second embodiment.

FIG. 21 is a flowchart showing exemplary processes performed by the processor 400 in the swing analyzing apparatus 1 according to Variation 1. The processor 400 first operates as the data acquisition section 401 to acquire angular velocity data from the sensor unit 10 (S510, angular velocity data acquisition step).

The processor 400 then operates as the attitude calculation section 402 to calculate the attitude of the sporting good based on the angular velocity data acquired in S510 (S520, attitude calculation step).

The processor 400 then operates as the rotational axis calculation section 406 to calculate at least one of the judgment axis and the swing axis (S522, rotational axis calculation step).

The processor 400 then operates as the impact detection section 403 to detect the impact timing (S530, impact detection step). For example, the processor 400 (impact detection section 403) detects, as the impact timing, the timing at which the magnitude of the angular velocity with respect to the swing axis calculated in S522 is maximized.

The processor 400 then operates as the attitude angle change calculation section 404 to calculate the amount of change in attitude angle of the sporting good in a predetermined period after the impact timing based on the information on the attitude of the sporting good calculated in S520 (S540, attitude angle change calculation step). For example, the processor 400 (attitude angle change calculation section 404) detects the amount of change in attitude angle of the judgment axis calculated in S522.

The processor 400 finally operates as the impact state judgment section 405 to judge the state of impact based on the calculation result in S540 (S550, impact state judgment step).

Figure 22:
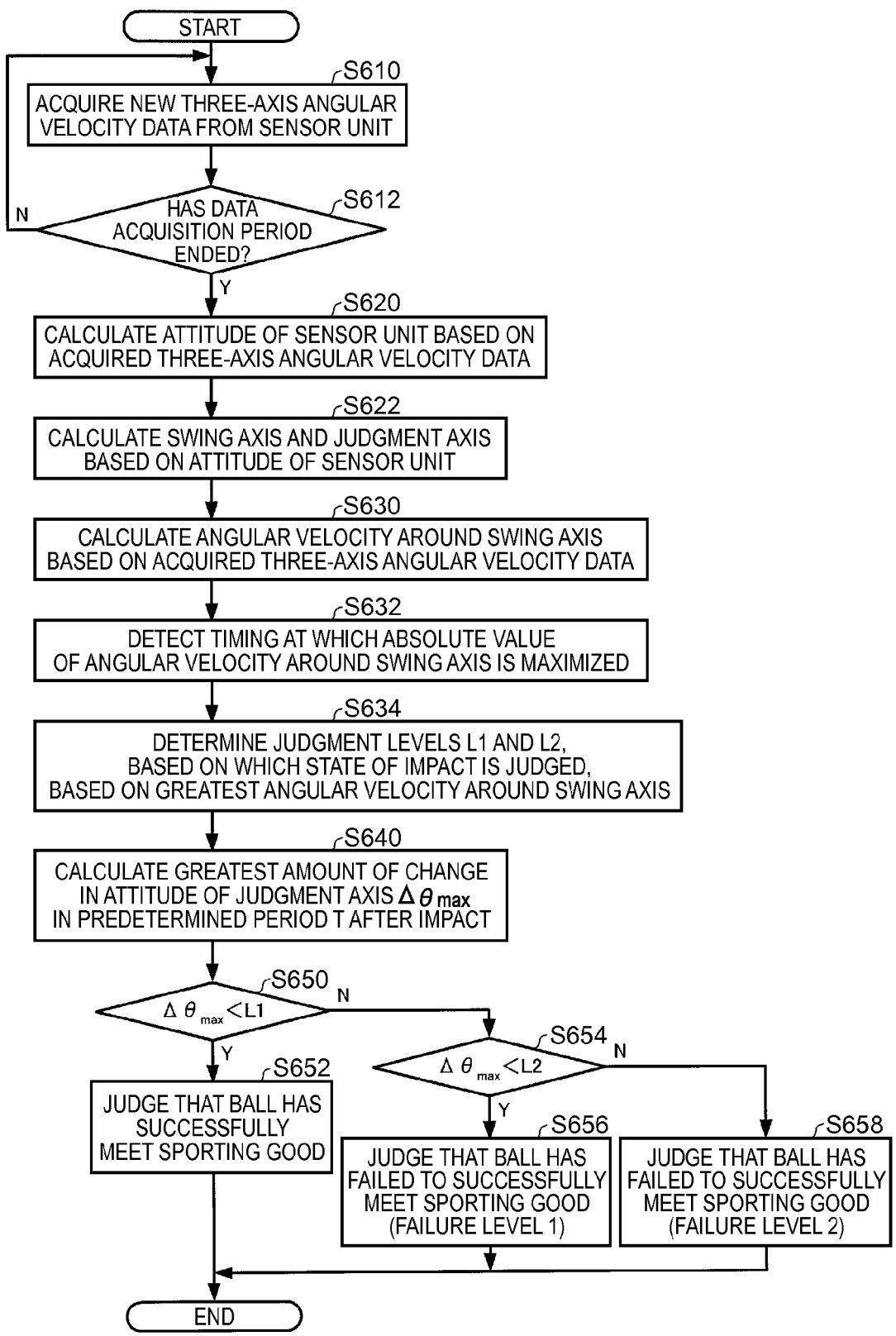
FIG. 22 shows a specific example of a flowchart according to which the state of impact is judged in the variation of the second embodiment.

FIG. 22 shows a specific example of a flowchart according to which the processor 400 in Variation 1 judges the state of the impact. In the example shown in FIG. 22, the state of impact is judged by using three levels. The processor 400 first periodically acquires new three-axis angular velocity data from the sensor unit 10 until a data acquisition period ends (N in S612) (S610).

The processor 400 then calculates the attitude of the sensor unit 10 based on the three-axis angular velocity data acquired in S610 (S620).

The processor 400 then calculates the swing axis and the judgment axis based on the information on the attitude of the sensor unit 10 calculated in S620 (S622). For example, the central axis of the rotational motion of the sensor unit 10 produced by a swing is calculated based on the change in attitude of the sensor unit 10 in the xyz coordinate system. The thus calculated central axis is the swing axis. Further, since the attitude of the sensor unit 10 in the xyz coordinate system changes at the time of impact, the judgment axis can be calculated based on the direction in which the attitude changes.

The processor 400 then calculates the angular velocity around the swing axis based on the three-axis angular velocity data acquired in S610 (S630). Since the angular velocity data with respect to the x, y, and z axes and the swing axis in the xyz coordinate system are known, the angular velocity around the swing axis can be calculated by performing known calculation.

The processor 400 then detects the timing at which the absolute value of the angular velocity around the swing axis is maximized (impact timing) (S632).

The processor 400 then determines judgment levels L1 and L2, based on which the state of impact is judged, based on the greatest angular velocity (greatest absolute value of angular velocity) around the swing axis (S634).

The processor 400 then calculates the greatest amount of change in attitude angle of the judgment axis $\Delta\theta_{max}$ in the predetermined period T after the impact timing detected in S632 (S640).

The processor 400 then compares $\Delta\theta_{max}$ with the judgment levels L1 and L2 determined in step S634. When $\Delta\theta_{max}<L1$ (Y in S650), the processor 400 judges that a ball has successfully met (perfectly met, for example) the sporting good (S652). When $L1 \leq \Delta\theta_{max} < L2$ (N in S650 and Y in S654), the processor 400 judges that the ball has failed to successfully meet (slightly failed to perfectly meet, for example) the sporting good (failure level 1) (S656). When $\Delta\theta_{max} \geq L2$ (N in S650 and N in S654), the processor 400 judges that the ball has failed to successfully meet (substantially failed to perfectly meet, for example) the sporting good (failure level 2) (S658).

As described above, the swing axis and the judgment axis can be calculated irrespective of the shape of a sporting good and the state of a swing by calculating the attitude of the sensor unit 10 (that is, attitude of sporting good), whereby the state of impact can be judged with precision.

S610 and S612 in the flowchart in FIG. 22 correspond to step S510 in the flowchart in FIG. 21 (angular velocity data acquisition step). S620 in the flowchart in FIG. 22 corresponds to S520 in the flowchart in FIG. 21 (attitude calculation step). S622 in the flowchart in FIG. 22 corresponds to S522 in the flowchart in FIG. 21 (rotational axis calculation step). S630 and S632 in the flowchart in FIG. 22 correspond to step S530 in the flowchart in FIG. 21 (impact detection step). S640 in the flowchart in FIG. 22 corresponds to S540 in the flowchart in FIG. 21 (attitude angle change calculation step). S650, S652, S654, S656, and S658 in the flowchart in FIG. 22 correspond to S550 in the flowchart in FIG. 21 (impact state judgment step).

2-3-2. Other Variations

For example, in the swing analyzing apparatus according to the present embodiment, the sensor unit 10 is wirelessly connected or wired to the host terminal 20, as shown in FIG. 14. Alternatively, each of the sensor unit 10 and the host terminal 20 may be provided with an interface for a memory card. In this case, the sensor unit 10 writes data outputted from the angular velocity sensors 300 onto the memory card, and the host terminal 20 then reads the data from the memory card to judge the state of impact. Still alternatively, the functions of the processor 400 in the host terminal 20 may be incorporated in the sensor unit 10.

Further, in the swing analyzing apparatus according to the present embodiment, the state of impact is judged after all angular velocity data that the processor 400 requires are acquired. Alternatively, the state of impact may be judged in real time whenever the processor 400 acquires angular velocity data.

Further, in the swing analyzing apparatus according to the present embodiment, the impact timing is detected based on the angular velocity around the swing axis. The impact timing may alternatively be detected, for example, by attaching an acceleration sensor to a sporting good in such a way that the detection axis of the acceleration sensor is perpendicular to the ball hitting plane of the sporting good and detecting, for example, the timing at which the acceleration is maximized based on data outputted from the acceleration sensor. In the case of a sporting good that does not allow a user to identify any ball hitting plane, a three-axis acceleration sensor may be attached to the sporting good (a two-axis acceleration sensor may be used depending on the position in which the acceleration sensor is attached), and an acceleration vector in a predetermined position on the sporting good is calculated.

The impact timing can then be detected based on the magnitude of the acceleration vector.

Further, the swing analyzing apparatus according to the present embodiment judges the state of impact based on the amount of change in attitude angle of the judgment axis immediately after the impact, but whether or not a ball has met a sweet spot cannot be accurately judged in some cases. For example, when a tennis racket is swung and a ball meets the tennis racket in a position on the major axis thereof other than a sweet spot, the swing analyzing apparatus can erroneously judges that a ball has successfully met the tennis racket because the amount of change in attitude angle of the judgment axis is small. In general, when a ball meets a sporting good in a position apart from a sweet spot, vibration produced in the sporting good is believed to be large. It is also believed that the magnitude of the vibration can be detected based on the change in angular velocity around the swing axis immediately after the impact. In view of the fact, whether or not the ball has met the sweet spot may be judged or how much the position where the ball has met the sporting good is apart from the sweet spot may be judged based on the angular velocity around the judgment axis and the angular velocity around the swing axis immediately after the impact.

The scope of the invention encompasses substantially the same configurations as the configuration described in the above embodiment (for example, a configuration having the same function, using the same method, and providing the same result and a configuration having the same purpose and providing the same effect). Further, the scope of the invention encompasses a configuration in which an inessential portion of the configuration described in the above embodiment is replaced. Moreover, the scope of the invention encompasses a configuration that provides the same advantageous effect as that provided in the configuration described in the above embodiment or a configuration that can achieve the same purpose. Further, the scope of the invention encompasses a configuration in which a known technology is added to the configuration described in the above embodiment.

The entire disclosure of Japanese Patent Application No. 2010-283279, filed Dec. 20, 2010 and No. 2010-283280, filed Dec. 20, 2010 are expressly incorporated by reference herein.

What is claimed is:

1. A swing analyzing apparatus comprising:
    an angular velocity sensor that detects an angular velocity of a sporting good about a predetermined axis;
    an impact detection section that detects impact timing in a swing of the sporting good;
    an angular velocity information calculation section that calculates at least one of the amount of change in angular velocity with respect to the predetermined axis in a predetermined period after the impact timing and a greatest value of the angular velocity based on the angular velocity outputted from the angular velocity sensor; and
    an impact state judgment section that judges a state of the impact based on a result calculated by the angular velocity information calculation section.

2. The swing analyzing apparatus according to claim 1, wherein the predetermined axis is an axis perpendicular not only to an axis around which the sporting good is swung but also to an axis along which the sporting good moves at the impact timing.

3. The swing analyzing apparatus according to claim 1, wherein the predetermined axis is an axis along which the sporting good moves at the impact timing.

4. The swing analyzing apparatus according to claim 1, wherein the impact detection section detects, as the impact timing, the timing at which a magnitude of the angular velocity with respect to the axis around which the sporting good is swung is maximized by detecting a greatest magnitude of the angular velocity with respect to the axis around which the sporting good is swung based on data outputted from the angular velocity sensor.

5. The swing analyzing apparatus according to claim 4, wherein the impact state judgment section variably sets a judgment reference based on which the state of the impact is judged in accordance with a greatest magnitude of the angular velocity with respect to the axis around which the sporting good is swung.

6. The swing analyzing apparatus according to claim 1, wherein the impact state judgment section judges the state of the impact by using a plurality of levels.

7. The swing analyzing apparatus according to claim 1, wherein the angular velocity sensor is so attached to the sporting good that a detection axis of the angular velocity sensor coincides with the predetermined axis.

8. The swing analyzing apparatus according to claim 1, wherein the angular velocity sensor is so attached to the sporting good that a detection axis of the angular velocity sensor coincides with the axis around which the sporting good is swung.

9. The swing analyzing apparatus according to claim 1, further comprising:
    an attitude calculation section that calculates an attitude of the sporting good based on data outputted from the angular velocity sensor; and
    a rotational axis calculation section that calculates at least one of the predetermined axis and the axis around which the sporting good is swung based on information on the attitude of the sporting good.

* * * * *